(12) United States Patent
Okada et al.

(10) Patent No.: US 8,414,278 B2
(45) Date of Patent: Apr. 9, 2013

(54) TIRE VULCANIZER

(75) Inventors: Kazuto Okada, Kobe (JP); Masatake Toshima, Kobe (JP); Tomomichi Murata, Takasago (JP); Yasuhiko Fujieda, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 12/736,231

(22) PCT Filed: Mar. 19, 2009

(86) PCT No.: PCT/JP2009/055448
§ 371 (c)(1),
(2), (4) Date: Sep. 22, 2010

(87) PCT Pub. No.: WO2009/119447
PCT Pub. Date: Oct. 1, 2009

(65) Prior Publication Data
US 2011/0008477 A1  Jan. 13, 2011

(30) Foreign Application Priority Data

Mar. 24, 2008 (JP) ................... 2008-075338
Jan. 26, 2009 (JP) ................... 2009-014089

(51) Int. Cl.
*B29C 35/04* (2006.01)
*B29C 33/04* (2006.01)
(52) U.S. Cl. .......... 425/42; 219/629; 425/174.8 R
(58) Field of Classification Search ............ 425/29, 425/40, 42, 174.8 R; 219/629
See application file for complete search history.

(56) References Cited

U.S. PATENT DOCUMENTS

| 3,415,968 A | * | 12/1968 | Watson | 219/629 |
| 4,747,765 A | | 5/1988 | Siegenthaler et al. | |
| 5,444,229 A | * | 8/1995 | Rudolph et al. | 219/629 |
| 6,474,968 B1 | * | 11/2002 | Mitamura et al. | 425/40 |
| 6,967,315 B2 | * | 11/2005 | Centanni et al. | 219/629 |

(Continued)

FOREIGN PATENT DOCUMENTS

CN  87 1 03665 A  3/1988
JP  58-012714 A  1/1983

(Continued)

OTHER PUBLICATIONS

International Search Report for Application PCT/JP2009/055448 mailed Jun. 23, 2009.

(Continued)

*Primary Examiner* — James Mackey
(74) *Attorney, Agent, or Firm* — Stites & Harbison, PLLC; Juan Carlos A. Marquez, Esq

(57) ABSTRACT

A tire vulcanizer used for vulcanizing a raw tire and includes a mold for removably housing the raw tire; a medium path which is connected to the inner space of the raw tire housed in the mold and through which a heating and pressurizing medium for vulcanizing the raw tire flows; and a heating unit, provided to the medium path, for controlling the temperature of the heating and pressurizing medium flowing through the medium path. The heating unit includes a heated body internally provided with a flow channel through which the heating and pressurizing medium flows, and an induction heating unit for heating the heated body through electromagnetic induction so as to heat the heating and pressurizing medium flowing through the flow channel.

10 Claims, 15 Drawing Sheets

U.S. PATENT DOCUMENTS

| | | | |
|---|---|---|---|
| 7,435,069 B2 * | 10/2008 | Okada et al. | 425/42 |
| 7,985,359 B2 * | 7/2011 | Mitamura et al. | 425/42 |
| 2004/0247717 A1 | 12/2004 | Okada et al. | |

FOREIGN PATENT DOCUMENTS

| | | | |
|---|---|---|---|
| JP | 8-096944 A | 4/1996 |
| JP | 2002-011722 A | 1/2002 |
| JP | 2002-036243 A | 2/2002 |
| JP | 2005-022399 A | 1/2005 |

OTHER PUBLICATIONS

Office Action from Chinese Patent Office with first Search Report, issued in the counterpart Chinese Chinese Patent Application No. 200980109796.1, dated Oct. 10, 2012, 6 pages in Chinese and 3 pp. of partial English translation.

* cited by examiner

TIRE VULCANIZER

TECHNICAL FIELD

The present invention relates to a tire vulcanizer.

BACKGROUND ART

Conventionally, known is a tire vulcanizer for vulcanizing a raw tire by supplying a high temperature and high pressure heating and pressurizing medium into the inner space of the raw tire housed inside a mold and thereby pressing the raw tire against the inner surface of the mold (for instance, refer to Patent Document 1).

The tire vulcanizer disclosed in Patent Document 1 comprises a medium path that is connected to the inner space of the raw tire housed in the mold, and the heating and pressurizing medium is supplied to the inner space of the raw tire through the medium path. In addition, a heater is provided to the medium path and the heating and pressurizing medium to be supplied to the inner space of the raw tire is preheated with the heater.

Meanwhile, as the heater, considered may be a configuration where a sheath heater is inserted into the piping of the medium path through which flows the heating and pressurizing medium, but with a heater that is configured as described above, there is a problem in that the rise in the temperature of the heating and pressurizing medium is delayed and the heat loss will increase.

Specifically, with this kind of heater, upon heating the heating and pressurizing medium, the heating wire of the sheath heater is foremost heated, and the heating and pressurizing medium is heated as a result of the foregoing heat being transferred to the heating and pressurizing medium via the insulator and sheath material of the sheath heater. Thus, the rise in the temperature of the heating and pressurizing medium will be delayed for the amount of thermal capacity of the sheath heater itself. In addition, with this kind of heater, it is necessary to increase the diameter of the piping in order to insert the sheath heater therein, and heat loss from the piping surface will consequently increase. Moreover, heat loss will also occur from the portion of the sheath heater that is positioned on the outside of the piping. Specifically, the overall heat loss will increase due to the foregoing types of heat loss. Patent Document 1: Japanese Patent Application Laid-open No. 2005-22399

DISCLOSURE OF THE INVENTION

Thus, an object of this invention is to provide a tire vulcanizer capable of accelerating the rise in the temperature of a heating and pressurizing medium and reducing heat loss.

On aspect of the present invention is a tire vulcanizer for vulcanizing a raw tire, including: a mold for removably housing the raw tire; a medium path which is connected to the inner space of the raw tire housed in the mold and through which the heating and pressurizing medium for vulcanizing the raw tire flows; and a heating unit, provided to the medium path, for controlling a temperature of the heating and pressurizing medium flowing through the medium path, wherein the heating unit includes a heated body internally provided with a flow channel through which the heating and pressurizing medium flows, and an induction heating unit for heating the heated body through electromagnetic induction so as to heat the heating and pressurizing medium flowing through the flow channel.

BEST MODE FOR CARRYING OUT THE INVENTION

Embodiments of the present invention are now explained with reference to the attached drawings.

Figure 2:
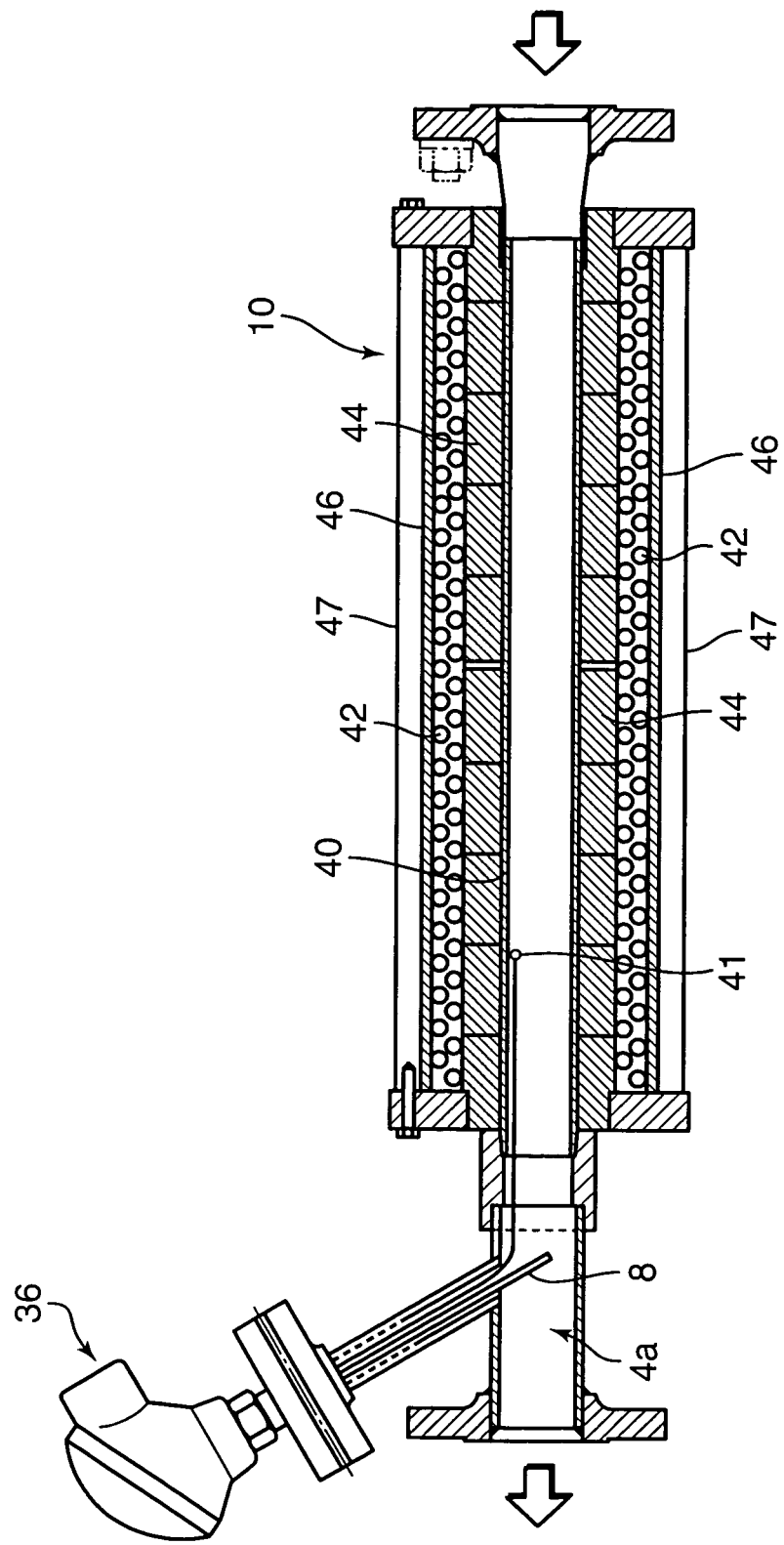
FIG. 2 is a cross section along the axial direction of the heating unit used in the tire vulcanizer shown in FIG. 1.
Figure 3:
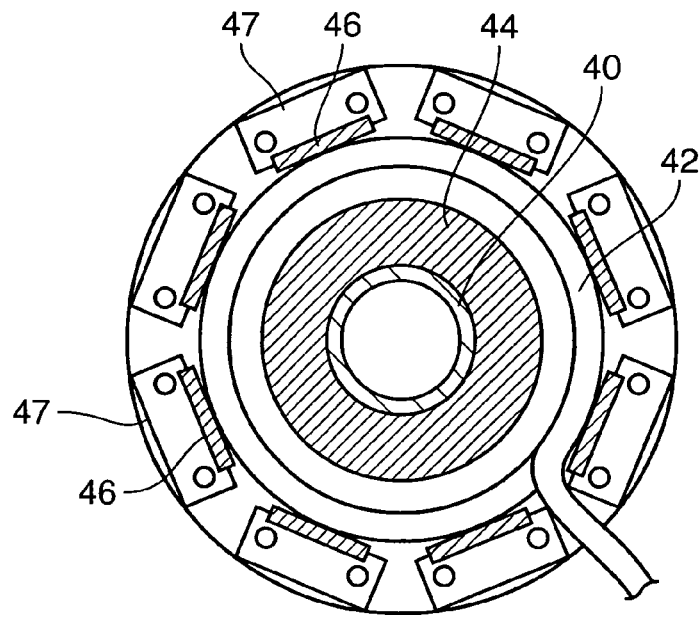
FIG. 3 is a cross section that is perpendicular to the axial direction of the heating unit used in the tire vulcanizer shown in FIG. 1.

The configuration of a tire vulcanizer 1 according to an embodiment of the present invention is foremost explained with reference to FIG. 1 to FIG. 3.

Figure 1:
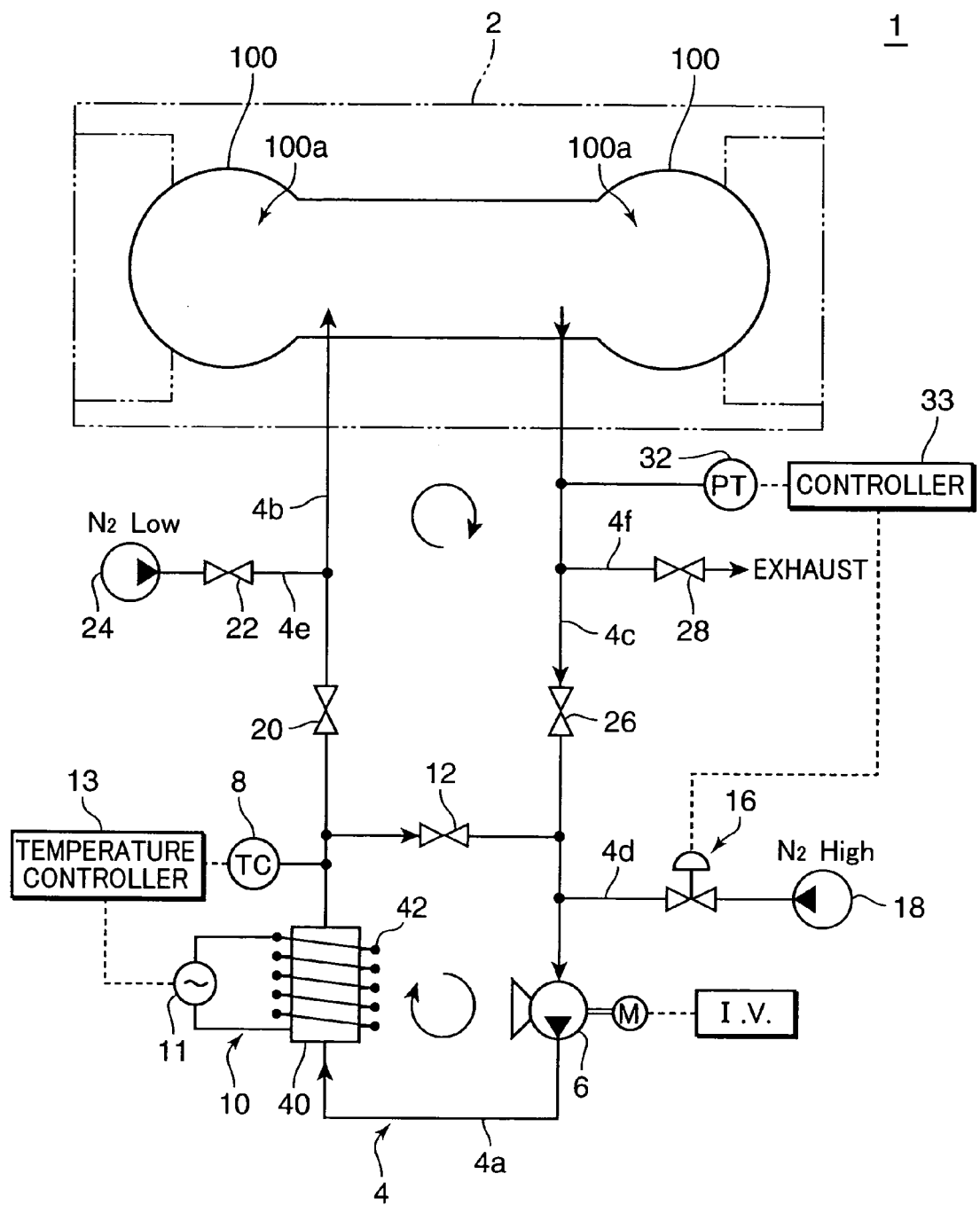
FIG. 1 is a schematic diagram of the tire vulcanizer according to an embodiment of the present invention.

The tire vulcanizer 1 according to this embodiment is used for vulcanizing a raw tire 100 and, as shown in FIG. 1, comprises a mold 2 for removably housing the raw tire 100, and a medium path 4 that is connected to the inner space 100a of the raw tire 100 housed in the mold 2 and through which flows a heating and pressurizing medium for vulcanizing the raw tire 100. In the ensuing explanation, a case of using nitrogen gas as the heating and pressurizing medium is explained.

A stretchable bladder (not shown) made from an elastic material such as butyl rubber is inserted inside the raw tire 100 housed in the mold 2. With the tire vulcanizer 1 of this embodiment, the raw tire 100 is vulcanized by supplying high temperature and high pressure nitrogen gas into the bladder; that is, into the inner space 100a of the raw tire 100 and causing the bladder to expand and become closely located to the inner surface of the raw tire 100, and pressing the outer surface of the raw tire 100 against the inner surface of the mold 2 based on the expansion power of the bladder. Note that the present invention can also be applied to a bladder-less type tire vulcanizer that does not use a bladder.

The medium path 4 includes a medium circulation pathway 4a for circulating the nitrogen gas in order to preheat the nitrogen gas, a medium supply pathway 4b that connects the medium circulation pathway 4a and the inner space 100a of the raw tire 100 and used for supplying the nitrogen gas from the medium circulation pathway 4a into the inner space 100a of the raw tire 100, and a medium collection pathway 4c that connects the medium circulation pathway 4a and the inner space 100a of the raw tire 100 and used for collecting the nitrogen gas from the inner space 100a of the raw tire 100 to the medium circulation pathway 4a.

The medium circulation pathway 4a includes a piping member through which nitrogen gas flows therein. The medium circulation pathway 4a is provided with a medium circulation device 6 for circulating the nitrogen gas in the medium circulation pathway 4a, a gas temperature sensor 8 for detecting the temperature of the nitrogen gas, a heating unit 10 for controlling the temperature of the nitrogen gas that is supplied to the inner space 100a of the raw tire 100 after flowing through the medium circulation pathway 4a, and a bypass valve 12 that is disposed between a section connected to the medium supply pathway 4b and a section connected to the medium collection pathway 4c within the medium circulation pathway 4a. Moreover, the tire vulcanizer 1 of this embodiment comprises a temperature controller 13 for controlling the thermal capability of the heating unit 10 based on the detection signal that is output from the gas temperature sensor 8.

In addition, a high pressure medium supply source path 4d is connected to a portion that is on the upstream side of the medium circulation device 6 in the flow direction of the nitrogen gas within the medium circulation pathway 4a and which is a portion that is between the place where the medium collection pathway 4c is connected and the place where the medium circulation device 6 is provided. The high pressure medium supply source path 4d is provided with a pressure control valve 16, and a high pressure gas supply source 18 for supplying high pressure nitrogen gas is connected to the position on the upstream side of the pressure control valve 16 within the high pressure medium supply source path 4d.

The medium supply pathway, 4b is provided with a medium supply valve 20. Moreover, a low pressure medium supply source path 4e is connected to the part between the medium supply valve 20 and the mold 2 within the medium supply pathway 4b. The low pressure medium supply source path 4e is provided with a valve 22, and a low pressure gas supply source 24 for supplying low pressure nitrogen gas is connected to the upstream side of the valve 22.

The medium collection pathway 4c is provided with a medium collection valve 26. Moreover, an exhaust path 4f is connected to the part between the medium collection valve 26 and the mold 2 within the medium collection pathway 4c, and the exhaust path 4f is provided with an exhaust valve 28. A pressure sensor 32 for detecting the pressure of the nitrogen gas is provided to the part that is closer to the mold 2 than the part to which the exhaust path 4f is connected within the medium collection pathway 4c.

The tire vulcanizer 1 additionally comprises a controller 33 for controlling the opening of the pressure control valve 16 based on the detection signal that is output from the pressure sensor 32. The controller 33 receives a signal that is output from the pressure sensor 32, and controls the opening of the pressure control valve 16 by outputting an appropriate command to the pressure control valve 16 based on the foregoing signal so that the pressure of the nitrogen gas becomes the intended pressure. The pressure of the nitrogen gas to be supplied to the inner space 100a of the raw tire 100 is controlled based on the opening control of the pressure control valve 16 by the controller 33.

The medium circulation device 6 is configured, for example, from a blower that is inverter-driven with an electric motor, and is able to change the gas flow rate; that is, the supplied air flow to be circulated in the medium circulation pathway 4a. The medium circulation device 6 is used for circulating the nitrogen gas in the medium circulation pathway 4a for preheating the nitrogen gas, supplying the nitrogen gas from the medium circulation pathway 4a to the inner space 100a of the raw tire 100 through the medium supply pathway 4b, and collecting the nitrogen gas from the inner space 100a of the raw tire 100 to the medium circulation pathway 4a through the medium collection pathway 4c.

The gas temperature sensor 8 is used for measuring the temperature of the nitrogen gas in the medium circulation pathway 4a and is configured, for example, from a thermocouple or the like. With the gas temperature sensor 8, as shown in FIG. 2, one end thereof is disposed inside the piping configuring the medium circulation pathway 4a, and the other end is connected to the temperature detection device 36. Data regarding the temperature of the nitrogen gas that was detected with the gas temperature sensor 8 is sent from the temperature detection device 36 to the temperature controller 13.

The heating unit 10 controls the temperature of the nitrogen gas to be supplied to the inner space 100a of the raw tire 100 upon flowing through the medium path 4 based on the detection signal that is output from the gas temperature sensor 8. The heating unit 10 includes, as shown in FIG. 2, a heated body 40, an induction heating unit 42, a thermal insulation material 44, and a ferromagnetic nonconductive member 46.

The heated body 40 is configured from a part of the piping member configuring the medium circulation pathway 4a, and internally includes a flow channel through which the nitrogen gas flows. The piping member configuring the heated body 40 is formed in a circular, straight tube shape using a ferromagnetic conductive material such as carbon steel or SUS420. Note that the material of the piping member is not limited to a ferromagnetic conductive material so as long as it is a material that can be subject to electromagnetic induction. Accordingly, the heated body 40 may also be formed from a highly thermal conductive material such as copper or aluminum. The heated body 40 may also be formed from a material possessing both characteristics; namely, ferromagnetic property and high thermal conductivity. As this kind of material, magnetic stainless steel or the like may be used. A heated body temperature sensor 41 for detecting the temperature of the heated body 40 is mounted at a prescribed location on the inner surface of the heated body 40. The heated body temperature sensor 41 is connected to the temperature detection device 36. Thus, data regarding the temperature of the heated body 40 that is detected with the heated body temperature sensor 41 is sent from the temperature detection device 36 to the temperature controller 13.

The induction heating unit 42 heats the heated body 40 through electromagnetic induction in order to heat the nitrogen gas flowing through the flow channel in the heated body 40. The induction heating unit 42 is configured from a magnetic force generating member that exerts a line of magnetic force to the piping member from the periphery of the piping member of the heated body 40. Specifically, the induction heating unit 42 is configured from a solenoidal coil made of litz wire, and is wound around the piping member of the heated body 40 as shown in FIG. 3. An AC source 11 (refer to FIG. 1) is connected to the coil. The coil radiates a line of magnetic force through energization from the AC source 11, and the heated body 40 is subject to induction heating as a result of the line of magnetic force being exerted on the heated body 40.

The thermal insulation material 44 is provided between the piping member of the heated body 40 and the coil of the induction heating unit 42, and inhibits the heat that is generated when the heated body 40 is subject to induction heating from being transferred to the induction heating unit 42. The thermal insulation material 44 is wound around the heated body 40 as shown in FIG. 3, and the coil of the induction heating unit 42 is additionally wound around the thermal insulation material 44.

The ferromagnetic nonconductive member 46 functions as a shield, and is provided to prevent the line of magnetic force that is generated from the induction heating unit 42 from radiating radially outward and concentrate the line of magnetic force that is generated from the induction heating unit 42 in the vicinity of the heated body 40 that is radially inward. The ferromagnetic nonconductive member 46 is formed in an elongated rectangular plate shape with ferrite as the material, and is disposed radially outward of the coil of the induction heating unit 42 and extends in the axial direction of the heated body 40. The ferromagnetic nonconductive member 46 is of a length that is able to cover the entire disposed range of the induction heating unit 42 in the axial direction of the heated body 40. Moreover, a plurality of the ferromagnetic nonconductive members 46 are disposed in even spacing in the circumferential direction of the coil of the induction heating unit 42. The respective ferromagnetic nonconductive members 46 are supported by an aluminum holder 47 that is fixed to the thermal insulation material 44.

The temperature controller 13 is a control device for controlling the thermal capability of the heating unit 10. The temperature controller 13 receives the detection signal of the gas temperature sensor 8 and the detection signal of the heated body temperature sensor 41, controls the power to be supplied to the coil of the induction heating unit 42 from the AC source 11 by outputting an appropriate command to the AC source 11 of the heating unit 10 based on the foregoing signals, and controls the thermal capability of the heating unit 10 based on such power control. By controlling the thermal capability of the heating unit 10 with the temperature controller 13, it is possible to control the temperature of the nitrogen gas to be supplied to the inner space 100a of the raw tire 100 from the medium circulation pathway 4a via the medium supply pathway 4b.

The operation of the tire vulcanizer 1 according to this embodiment is now explained.

Foremost, while inserting the bladder into the inner space 100a of the raw tire 100, the raw tire 100 is placed in the mold 2.

Subsequently, the valve 22 provided to the low pressure medium supply source path 4e is opened, and thereby low pressure nitrogen gas is supplied from the low pressure gas supply source 24 into the bladder through the low pressure medium supply source path 4e and the medium supply pathway 4b in order to expand the bladder. Consequently, the raw tire 100 is shaped and retained. The mold 2 is thereafter completely closed and locked to complete the molding clamping of the mold 2. When the mold clamping of the mold 2 is complete, the valve 22 is closed.

While performing the operation of housing the raw tire 100 inside the mold 2, nitrogen gas is preheated in the medium circulation pathway 4a. Here, the medium collection valve 26 and the medium supply valve 20 are closed, and the bypass valve 12 is opened. Pursuant to the opening and closing of the respective valves, a closed circuit is formed for circulating the nitrogen gas in the medium circulation pathway 4a in order to preheat the nitrogen gas. The high pressure nitrogen gas that is supplied from the high pressure gas supply source 18 is introduced into the medium circulation pathway 4a through the pressure control valve 16 and the high pressure medium supply source path 4d, and the introduced nitrogen gas circulates in the medium circulation pathway 4a as a result of the nitrogen gas being blowed by the medium circulation device 6.

The nitrogen gas that is circulating in the medium circulation pathway 4a is preheated with the heating unit 10. Specifically, as a result of power being supplied to the coil of the induction heating unit 42 from the AC source 11 in the heating unit 10, a line of magnetic force is generated from the coil and such line of magnetic force is exerted on the heated body 40, and the heated body 40 thereby generates heat through electromagnetic induction. The heat generated by the heated body 40 is transferred to the nitrogen gas flowing in the heated body 40, and the nitrogen gas is thereby heated.

Here, the temperature of the nitrogen gas is detected with the gas temperature sensor 8, and the temperature controller 13 controls the thermal capability of the heating unit 10 so that the nitrogen gas becomes the intended temperature based on the detected temperature. Specifically, the temperature controller 13 controls the power to be supplied to the coil from the AC source 11 of the heating unit 10 to the induction heating unit 42 based on the detected temperature of the gas temperature sensor 8. Consequently, the amount of heat that is generated by the heated body 40 through electromagnetic induction is controlled and thereby the temperature of the nitrogen gas is adjusted to the intended temperature.

Meanwhile, separate from the temperature adjustment of the nitrogen gas with the heating unit 10, the pressure of the nitrogen gas that is introduced from the high pressure medium supply source path 4d to the medium circulation pathway 4a and which circulates in the medium circulation pathway 4a is adjusted to the intended pressure based on the opening control of the pressure control valve 16 by the controller 33.

After confirming that the nitrogen gas in the medium circulation pathway 4a has risen to the intended temperature and the mold clamping of the mold 2 is complete, by closing the bypass valve 12 and opening the medium supply valve 20 and the medium collection valve 26, the nitrogen gas in the medium circulation pathway 4a is supplied to the inner space 100a of the raw tire 100 through the medium supply pathway 4b.

Prior to flowing the nitrogen gas in the medium circulation pathway 4a into the medium supply pathway 4b, the nitrogen gas is preheated while it is circulated in the medium circulation pathway 4a. Consequently, the rise time that is required for raising the temperature of the nitrogen gas to be supplied to the inner space 100a of the raw tire 100 to the intended temperature immediately after the vulcanization is commenced can be shortened. Subsequently, the bladder is expanded by the high temperature and high pressure nitrogen gas being supplied to the inner space 100a of the raw tire 100; that is, into the bladder, the raw tire 100 is pressed against the inner surface of the mold 2 based on the expansion power of the bladder, and the raw tire 100 is thereby vulcanized.

The nitrogen gas that is used in the vulcanization is returned from the inner space 100a of the raw tire 100 to the medium circulation pathway 4a through the medium collection pathway 4c. The nitrogen gas that returned to the medium circulation pathway 4a is heated once again with the heating unit 10, and thereafter once again supplied to the inner space 100a of the raw tire 100 through the medium supply pathway 4b. Here, the pressure control of nitrogen gas; specifically, control of the absolute value of the nitrogen gas pressure and control of the pressure change of nitrogen gas in relation to the passage of time, are performed not only with the opening adjustment of the pressure control valve 16, but also with the opening adjustment of the exhaust valve 28.

If the pressure of nitrogen gas in the medium path 4 or the inner space 100a of the raw tire 100 decreases, the pressure control valve 16 is opened by the controller 33, and thereby high pressure nitrogen gas is resupplied to the medium path 4 from the high pressure gas supply source 18.

As explained above, with this embodiment, it is possible to heat the heated body 40 in the heating unit 10 through electromagnetic induction and heat the nitrogen gas flowing through the flow channel in the heated body 40 using the foregoing heat. Specifically, with this embodiment, since the nitrogen gas flowing inside the heated body 40 can be heated by causing the heated body 40 to generate heat directly, unlike the case of heating the nitrogen gas using the sheath heater inserted into the piping, there will be no delay in the rising of the temperature caused by the thermal capacity of the sheath heater. Thus, the rising of the temperature of the nitrogen gas can be accelerated.

In addition, with this embodiment, since the nitrogen gas is heated by causing the heated body 40 to generate heat directly through electromagnetic induction, unlike the case of using the sheath heater inserted into the piping, it is not necessary to expand the diameter of the piping for inserting the sheath heater therein, and there will be no increase in the heat radiation area caused by a part of the sheath heater being positioned outside of the piping. Thus, with this embodiment, it is possible to reduce the heat radiation area in comparison to the case of using the sheath heater, and consequently reduce heat loss.

Moreover, with this embodiment, since the nitrogen gas can be heated with the medium path 4 (medium circulation pathway 4a) inside the tire vulcanizer 1, unlike a tire vulcanizer that vulcanizes the raw tire 100 by supplying externally-generated steam to the medium path and introducing such steam to the inner space 100a of the raw tire 100 from the medium path, it is possible to prevent the heat loss associated with the transport of the nitrogen gas from the outside, and consequently reduce heat loss. Accordingly, with this embodiment, it is possible to accelerate the rise in the temperature of the nitrogen gas and reduce heat loss.

Moreover, with this embodiment, since the thermal insulation material 44 is provided between the heated body 40 and the coil of the induction heating unit 42 in the heating unit 10, it is possible to prevent the heat of the heated body 40 from being transferred to the coil of the induction heating unit 42 with the thermal insulation material 44 upon heating the heated body 40 through electromagnetic induction. Thus, it is possible to inhibit the thermal degradation of the coil of the induction heating unit 42. Moreover, even if the thermal insulation material 44 is disposed between the heated body 40 and the induction heating unit 42 as described above, since the heated body 40 is heated through electromagnetic induction with this embodiment, the thermal insulation material 44 will not obstruct the heating of the heated body 40 and thereby the heated body 40 can be heated effectively.

In addition, with this embodiment, since the heated body 40 of the heating unit 10 is configured from a part of the piping member configuring the medium circulation pathway 4a, the heated body 40 can concurrently function as a part of the piping member of the medium circulation pathway 4a. Thus, it is possible to reduce the number of members and inhibit the manufacturing cost of the heated body 40 in comparison to a case of separately providing the piping member of the medium circulation pathway 4a and the heated body 40.

Moreover, with this embodiment, since the ferromagnetic nonconductive member 46 is disposed on the outside of the induction heating unit 42 in a radial direction of the piping member configuring the heated body 40, the ferromagnetic nonconductive member 46 will function as a shield, and thereby it is possible to prevent the line of magnetic force radiated from the induction heating unit 42 from being transferred to the outside and concentrate such line of magnetic force on the inside. Consequently, it is possible to prevent the line of magnetic force radiated from the induction heating unit 42 from being transferred to the outside and unintentionally heating the other piping or metal members, prevent adverse effects to the outside world caused by the line of magnetic force radiated from the induction heating unit 42, and favorably perform heating through electromagnetic induction by concentrating the line of magnetic force radiated from the induction heating unit 42 on the internal heated body 40.

In addition, with this embodiment, since the induction heating unit 42 is configured from a coil wound around the piping member configuring the heated body 40 and which radiates a line of magnetic force through energization, it is possible to uniformly exert the line of magnetic force from the periphery of the piping member configuring the heated body 40 and thereby uniformly generate electromagnetic induction in the circumferential direction of the heated body 40, and consequently inhibit the generation of uneven heating in the circumferential direction of the heated body 40.

Moreover, with this embodiment, since the piping member of the heated body 40 is configured from a ferromagnetic conductive material that is favorably subject electromagnetic induction, the heating of the nitrogen gas can be performed favorably through the electromagnetic induction of the heated body 40.

The test results upon examining the effect of improvement in the temperature rise performance of the raw tire 100 that is obtained by using the tire vulcanizer of the foregoing embodiment are now explained.

Figure 4:
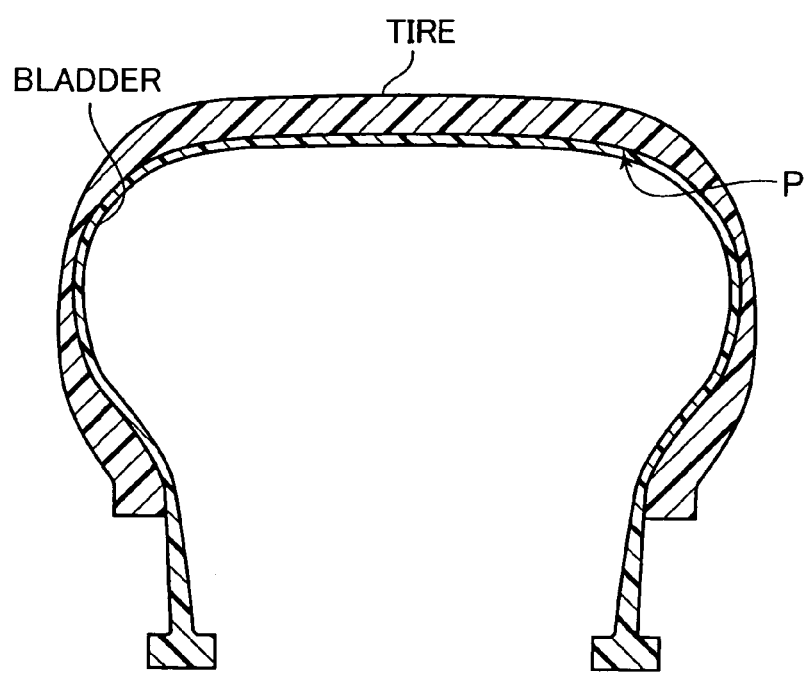
FIG. 4 is a diagram explaining the section where the tire temperature was measured in the test for examining the effects of the tire vulcanizer according to an embodiment of the present invention.

In this test, the change in tire temperature associated with the lapse in the vulcanizing time was measured upon forming a tire having a tire size of 175/65R14. Measurement of the tire temperature was performed by measuring the temperature of the inner shoulder part represented with point P within the tire inner surface of FIG. 4. The test results are shown in FIG. 5.

Figure 5:
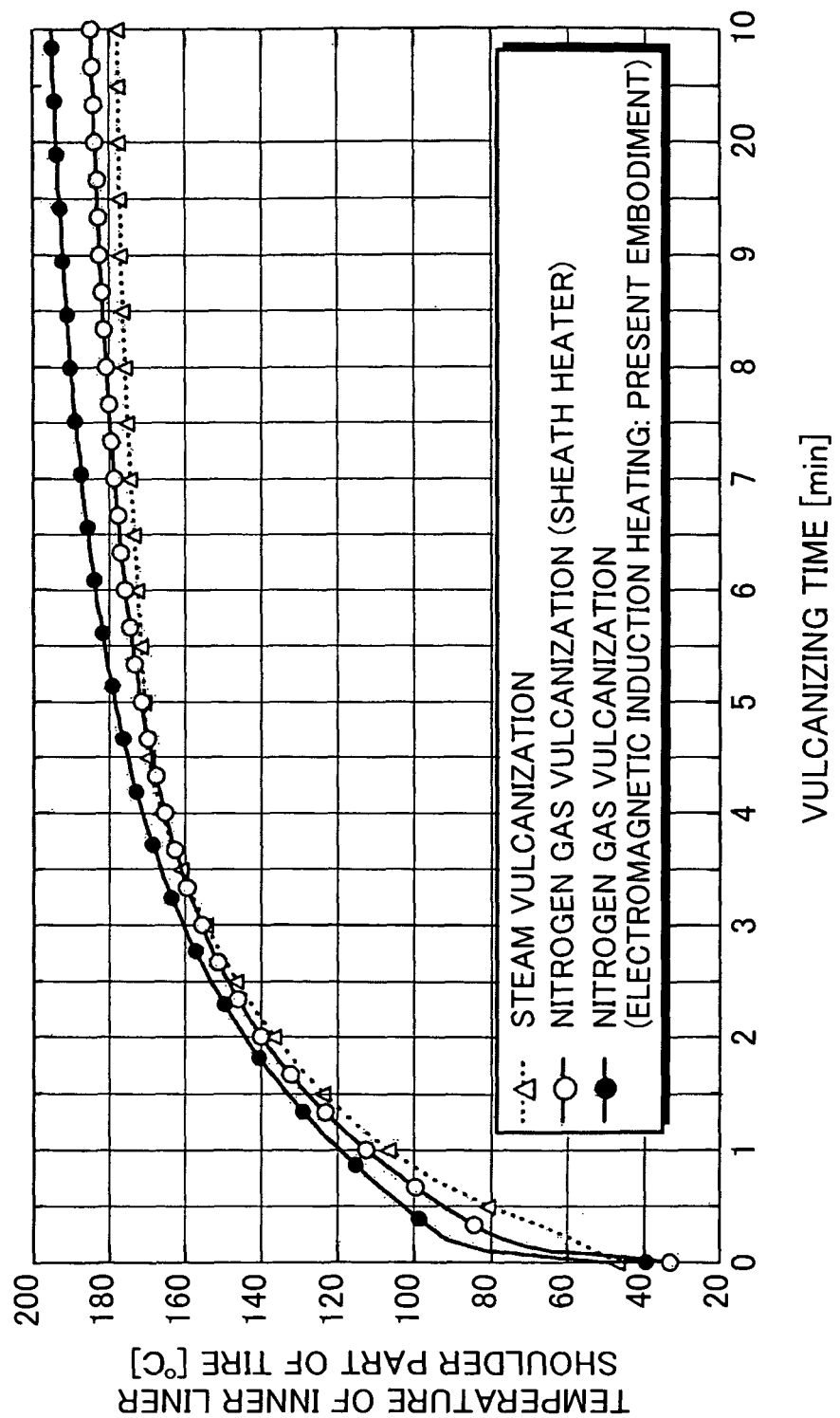
FIG. 5 is a diagram showing the results of measuring the correlation of the vulcanizing time and tire temperature in the test for examining the effects of the tire vulcanizer according to an embodiment of the present invention.

From the results of FIG. 5, it is evident that the rise of the tire temperature from the start of vulcanization is faster when vulcanizing the raw tire 100 with the nitrogen gas that was heated through electromagnetic induction heating of the heated body 40 in the heating unit 10 as with the foregoing embodiment in comparison to vulcanization that is performed by supplying the nitrogen gas which was heated with the sheath heater to the inner space 100a of the raw tire 100 or vulcanization that is performed by supplying steam which was generated outside of the tire vulcanizer to the inner space 100a of the raw tire 100. Vulcanization using the electromagnetic induction heating of the foregoing embodiment is able to raise the tire temperature approximately 10 seconds faster up to approximately 140° C., which is generally required for vulcanizing the raw tire 100, in comparison to the vulcanization that performs heating with the sheath heater, and approximately 20 seconds faster up to approximately 140° C. in comparison to the vulcanization that performs heating with the steam.

From the foregoing results, if the tire vulcanizer of the foregoing embodiment is used, the time required for vulcanizing the raw tire 100 can be shortened, and it is considered to be effective in improving the productivity.

The embodiment disclosed above is merely an exemplification in all respects, and should not be considered restrictive. The scope of this invention is defined in the claims and not in the explanation of the foregoing embodiment, and further covers all modifications within the equal meaning and scope as the invention claimed herein.

Figure 6:
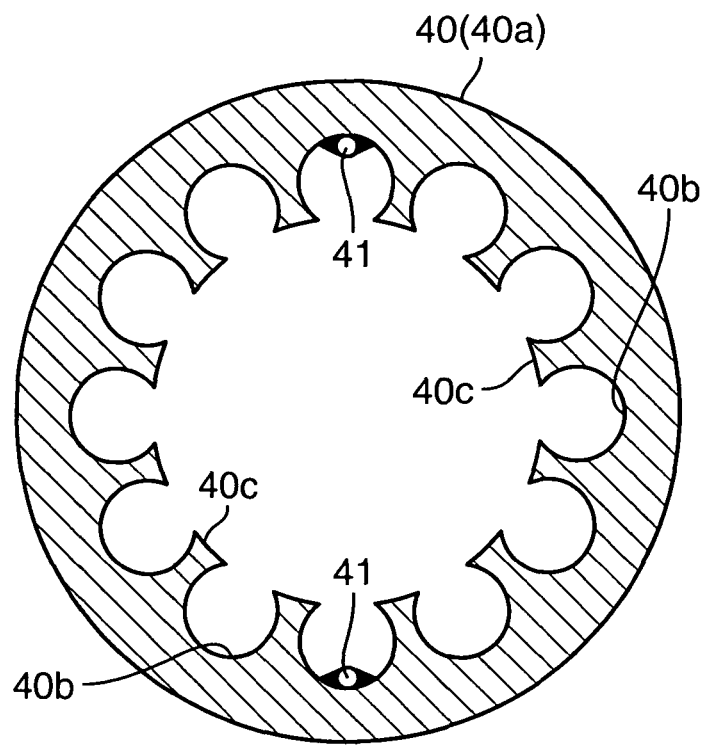
FIG. 6 is a cross section that is perpendicular to the axial direction of the heated body according to the first modified example of an embodiment of the present invention.
Figure 7:
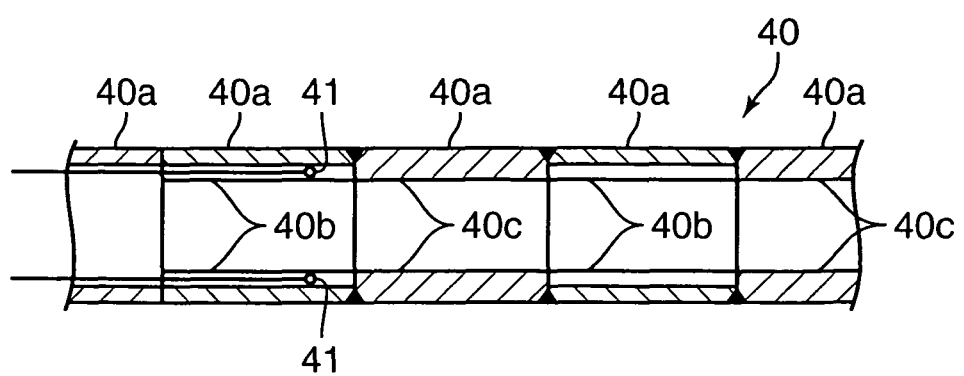
FIG. 7 is a cross section along the axial direction of the heated body according to the first modified example of an embodiment of the present invention.

For example, as with the first modified example of the foregoing embodiment shown in FIG. 6 and FIG. 7, the heated body 40 may include an inner surface encompassing the flow channel and to which concave-convex parts are formed. FIG. 6 shows cross section that is perpendicular to the axial direction of the heated body 40 according to the first modified example, and FIG. 7 shows cross section along the axial direction of the heated body 40 according to the first modified example.

The heated body 40 according to the first modified example is formed by a plurality of straight tube-shaped heated body segments 40a being connected via welding in the axial direction. The inner surface of the respective heated body segments 40a is shaped such that a concave part 40b and a convex part 40c are alternately formed in the circumferential direction. Each concave part 40b and each convex part 40c extend linearly in the axial direction of the heated body segment 40a. Each concave part 40b is formed to take on an approximately circular shape in the cross section that is perpendicular to the axial direction of the heated body 40. The concave part 40b and the convex part 40c of the respective heated body segments 40a which are adjacent in the axial direction of the heated body 40 are disposed so that the phases in the circumferential direction are mutually displaced.

In this first modified example, two heated body temperature sensors 41 are provided inside the heated body 40. The respective heated body temperature sensors 41 are mounted in the concave parts 40b that face each other in the heated body segment 40a and mounted at a position that is closest to the outermost surface of the heated body segment 40a in such concave parts 40b.

The respective heated body segments 40a are formed by forming a plurality of small diameter round holes that penetrate in the axial direction of a cylindrical rod material at even spacing around the axis of such rod material, and thereafter forming large diameter round holes that penetrate in the axial direction at the center of such plurality of small diameter round holes so that they slightly overlap with each of the small diameter round holes. Subsequently, the plurality of heated body segments 40a prepared as described above are connected in the axial direction via welding. Here, the heated body segments 40a that are adjacent to each other are connected in a state such that the phases of the concave part 40b and the convex part 40c in the circumferential direction are mutually displaced. The heated body 40 according to the first modified example is thereby formed.

According to the configuration of the first modified example, since it is possible to increase by the concave part 40b and the convex part 40c the surface area of the inner surface of the heated body 40 that comes in contact with the nitrogen gas, the heating efficiency of the nitrogen gas can be improved.

In addition, according to the first modified example, as a result of the concave part 40b and the convex part 40c of the inner surface of the heated body segments 40a which are adjacent in the axial direction being disposed so that the phases in the circumferential direction are mutually displaced, the velocity boundary layer of the nitrogen gas flowing through the flow channel in the heated body 40 will be updated, and thereby heat can be sufficiently transferred from the heated body 40 to the nitrogen gas. Consequently, it is possible to improve the heating efficiency of the nitrogen gas.

Here, the velocity boundary layer refers to the range formed in the vicinity of the inner surface of the heated body 40 in which the flow rate decreases to a constant rate or lower within the flow of the nitrogen gas that flowing in the heated body 40. The velocity boundary layer is characterized in that heat is not transferred easily in comparison to the other flow layers of nitrogen gas in which the rate has not decreased. In the first modified example, as a result of the concave part 40b and the convex part 40c being disposed so that the phases in the circumferential direction are mutually displaced, the flow of the nitrogen gas flowing in the heated body 40 in the axial direction will be disturbed in the vicinity of the inner surface of the heated body 40, and thereby the velocity boundary layer will be updated each time it passes through the vicinity of the concave part 40b and the convex part 40c. Meanwhile, if the heated body is configured from a monotonic circular tube without any concavity-convexity on the inner surface or from an aggregate of such monotonic circular tubes and the nitrogen gas is to flow through the flow channel in such circular tubes, the velocity boundary layer will develop thickly in the vicinity of the inner surface of the circular tubes. Thus, according to the configuration of the foregoing first modified example, in comparison to a case of using the foregoing monotonic circular tubes, it is possible to inhibit the obstruction of heat transfer from the inner surface of the heated body 40 to the nitrogen gas caused by the velocity boundary layer, and favorably transfer heat from the inner surface of the heated body 40 to the nitrogen gas.

Note that, in a configuration where a plurality of heated body segments 40a are connected in the axial direction as with the first modified example, the respective heated body segments 40a may also be connected such that the phases in the circumferential direction of the concave part 40b and the convex part 40c of the heated body segments 40a that are adjacent in the axial direction will coincide.

Figure 8:
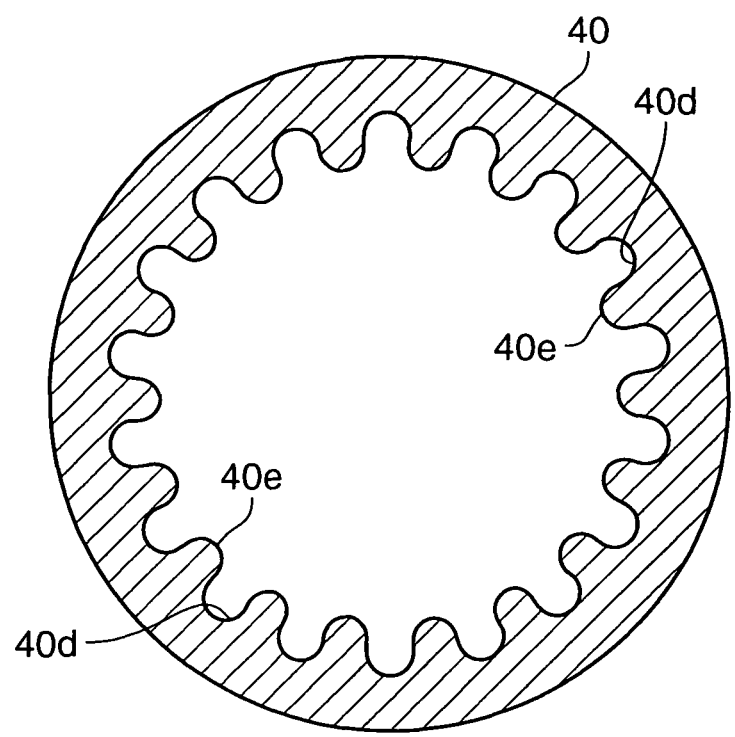
FIG. 8 is a cross section that is perpendicular to the axial direction of the heated body according to the second modified example of an embodiment of the present invention.

Moreover, as with the second modified example of the foregoing embodiment shown in FIG. 8, the concave-convex parts formed on the inner surface of the heated body 40 may be shaped in a waveform in the circumferential direction. FIG. 8 shows a cross section that is perpendicular to the axial direction of the heated body 40 according to a second modified example.

The heated body 40 according to the second modified example is configured from a single straight tube-shaped piping member without any joints, and the inner surface of the heated body 40 is shaped in a waveform in the circumferential direction as a result of the concave part 40d and the convex part 40e being alternately formed on the inner surface of the heated body 40 in the circumferential direction. The concave part 40d and the convex part 40e extend linearly in the axial direction of the heated body 40. Moreover, the piping member configuring the heated body 40 according to the second modified example is formed with a single extrusion process.

With the configuration of the second modified example also, since the surface area of the inner surface of the heated body 40 to come in contact with the nitrogen gas can be increased with the concave part 40d and the convex part 40e, the heating efficiency of the nitrogen gas can be improved.

In addition, since a structure in which the concave parts 40d and the convex parts 40e extending linearly in the axial direction are provided to the inner surface of a single straight tube-shaped heated body 40 as with the second modified example can be formed with a single extrusion process, the manufacturing process of the heated body 40 having concave-convex parts on the inner surface thereof can be simplified.

Figure 9:
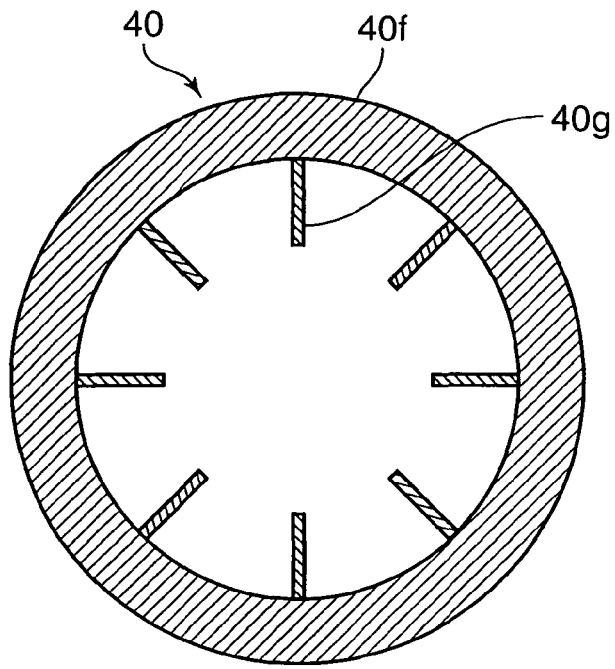
FIG. 9 is a cross section that is perpendicular to the axial direction of the heated body according to the third modified example of an embodiment of the present invention.

Moreover, a plurality of fins 40g may be provided as the concave-convex parts on the inner surface of the heated body 40 as with the third modified example of the foregoing embodiment shown in FIG. 9. FIG. 9 shows a cross section that is perpendicular to the axial direction of the heated body 40 according to the third modified example.

The heated body 40 according to the third modified example is configured from a straight tube-shaped piping member 40f and a plurality of tabular fins 40g. The plurality of fins 40g are provided in equal spacing on the inner surface of the piping member 40f in the circumferential direction. The plurality of fins 40g are disposed radially, and the respective fins 40g are protruding radially inward from the inner surface of the piping member 40f. Moreover, the respective fins 40g extend linearly in the axial direction of the heated body 40. The piping member 40f is configured, for example, from a ferromagnetic conductive material such as carbon steel or SUS420, and the fin 40g is configured from a highly thermal conductive material such as copper or aluminum.

With the configuration of the third modified example also, since the surface area of the inner surface of the heated body 40 to come in contact with the nitrogen gas can be increased as a result of a plurality of fins 40g being provided to the inner surface of the heated body 40 as described above, the heating efficiency of the nitrogen gas flowing through the flow channel in the heated body 40 can be improved.

In addition, with the configuration of the third modified example, since the respective fins 40g extend linearly in the axial direction of the heated body 40, the flow of the nitrogen gas through the flow channel in the heated body 40 will not be obstructed easily even if the foregoing fins 40g are provided. Thus, it is possible to inhibit the increase of pressure loss of the nitrogen gas flowing through the flow channel in the heated body 40 while improving the heating efficiency of the nitrogen gas with the plurality of fins 40g.

Moreover, with the third modified example, since the piping member 40f of the heated body 40 is configured from a ferromagnetic conductive material and the plurality of fins 40g provided to the inner surface of the piping member 40f are configured from a highly thermal conductive material, the piping member 40f can be favorably subject to electromagnetic induction heating, and the heat that is generated by the piping member 40f through the electromagnetic induction heating can be favorably transferred to the nitrogen gas through the fins 40g.

Note that, in the third modified example, the shape of the fins 40g is not limited to a tabular shape, and it may also be a spiral shape that is twisted in the axial direction of the piping member 40f.

Figure 10:
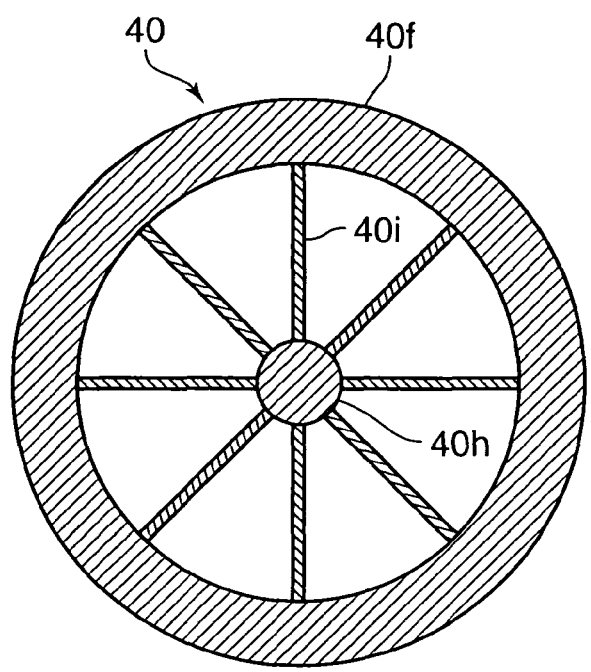
FIG. 10 is a cross section that is perpendicular to the axial direction of the heated body according to the fourth modified example of an embodiment of the present invention.

Moreover, a core 40h extending in the axial direction may be provided to a position corresponding to the shaft center of the heated body 40 and a plurality of fins 40i protruding from the inner surface of the piping member 40f may be connected to the core 40h as with the fourth modified example of the foregoing embodiment shown in FIG. 10. FIG. 10 shows a cross section that is perpendicular to the axial direction of the heated body 40 according to the fourth modified example.

The heated body 40 according to the fourth modified example is configured from a straight tube-shaped piping member 40f, a core 40h, and a plurality of tabular fins 40i. The plurality of tabular fins 40i are provided in equal spacing to the inner surface of the piping member 40f in the circumferential direction, and disposed radially. Moreover, the respective fins 40i extend linearly in the axial direction of the heated body 40, and protrude radially inward from the inner surface of the piping member 40f. The edge of the respective fins 40i positioned radially inward of the heated body 40 is connected to the peripheral surface of the core 40h disposed at a position corresponding to the shaft center of the heated body 40. The respective fins 40i are configured from a highly thermal conductive material such as copper or aluminum as with the fins 40g of the foregoing third modified example.

According to the configuration of the fourth modified example, it is possible to increase the rigidity of the fins 40i as a result of such plurality of fins 40i being supported by the core 40h, and consequently prevent the fins 40i from deforming due to the pressure of the nitrogen gas upon the nitrogen gas flowing through the flow channel in the heated body 40. Moreover, the fourth modified example is able to yield the same effects as the foregoing third modified example.

Note that, in the fourth modified example also, the shape of the fins 40i is not limited to a tabular shape, and it may also be a spiral shape that is twisted in the axial direction of the piping member 40f.

Figure 11:
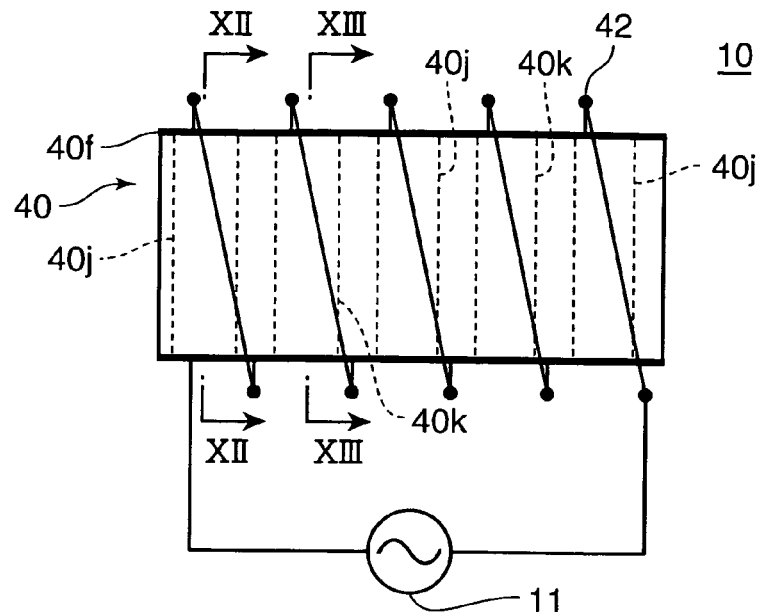
FIG. 11 is a schematic diagram of the heating unit according to the fifth modified example of an embodiment of the present invention.
Figure 12:
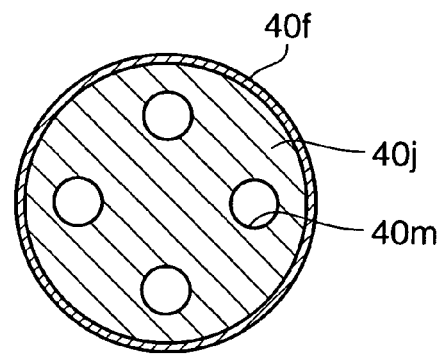
FIG. 12 is a cross section along line XII-XII of the heated body according to the fifth modified example shown in FIG. 11.
Figure 13:
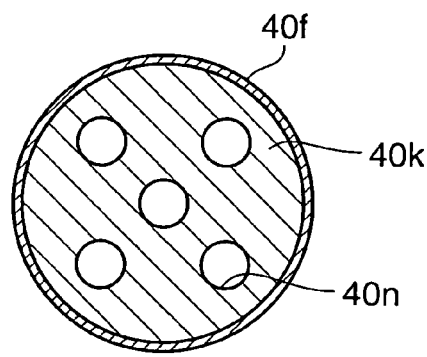
FIG. 13 is a cross section along line XIII-XIII of the heated body according to the fifth modified example shown in FIG. 11.

Moreover, perforated plates 40j, 40k disposed in a direction of blocking the flow channel may be provided inside the heated body 40 as with the fifth modified example of the foregoing embodiment shown in FIG. 11 to FIG. 13. FIG. 11 shows a schematic diagram of the heating unit 10 according to the fifth modified example, FIG. 12 shows a cross section along line XII-XII of the heated body 40 shown in FIG. 11, and FIG. 13 shows a cross section along line XIII-XIII of the heated body 40 shown in FIG. 11.

The heated body 40 according to the fifth modified example is configured from a straight tube-shaped piping member 40f, a first perforated plate 40j, and a second perforated plate 40k. A plurality of first perforated plates 40j and second perforated plates 40k are respectively provided in the piping member 40f. The first perforated plate 40j and the second perforated plate 40k are alternately disposed in a predetermined spacing in the axial direction of the heated body 40. The respective perforated plates 40j, 40k are disposed in a direction of blocking the flow channel in the heated body 40 (piping member 40f); specifically, perpendicular to the axial direction of the heated body 40. The respective perforated plates 40j, 40k have a disk-like outer shape, and the respective perforated plates 40j, 40k are fixed to the piping member 40f as a result of the peripheral edge of the respective perforated plates 40j, 40k being connected to the inner surface of the piping member 40f.

The first perforated plate 40j is provided with four through-holes 40m for passing the nitrogen gas therethrough in a manner of extending in the axial direction of the heated body 40. The four through-holes 40m are disposed in a predetermined spacing around the axis of the heated body 40. The second perforated plate 40k is provided with five through-holes 40n for passing the nitrogen gas therethrough in a manner of extending in the axial direction of the heated body 40. One through-hole among the foregoing five through-holes 40n is disposed at a position corresponding to the shaft center of the heated body 40; that is, at the center position of the second perforated plate 40k, and the remaining four through-holes are disposed in a predetermined spacing around the axis of the heated body 40. The through-hole 40m of the first perforated plate 40j and the through-hole 40n of the second perforated plate 40k are disposed at a mutually displaced position when viewed from the axial direction of the heated body 40.

According to the configuration of the fifth modified example, since the flow of the nitrogen gas flowing in the heated body 40 is disturbed with the first perforated plate 40j and the second perforated plate 40k, the velocity boundary layer that is formed in the vicinity of the inner surface of the heated body 40 will become thin. Consequently, it is possible to sufficiently transfer heat from the heated body 40 to the nitrogen gas, and improve the heating efficiency of the nitrogen gas since the surface area inside the heated body 40 to come in contact with the nitrogen gas will increase due to the first perforated plate 40j and the second perforated plate 40k.

Note that the number of through-holes and the positioning thereof in the respective perforated plates 40j, 40k are not limited to the configuration of the foregoing fifth modified example, and various number of through-holes and the positioning thereof may be applied.

Figure 14:
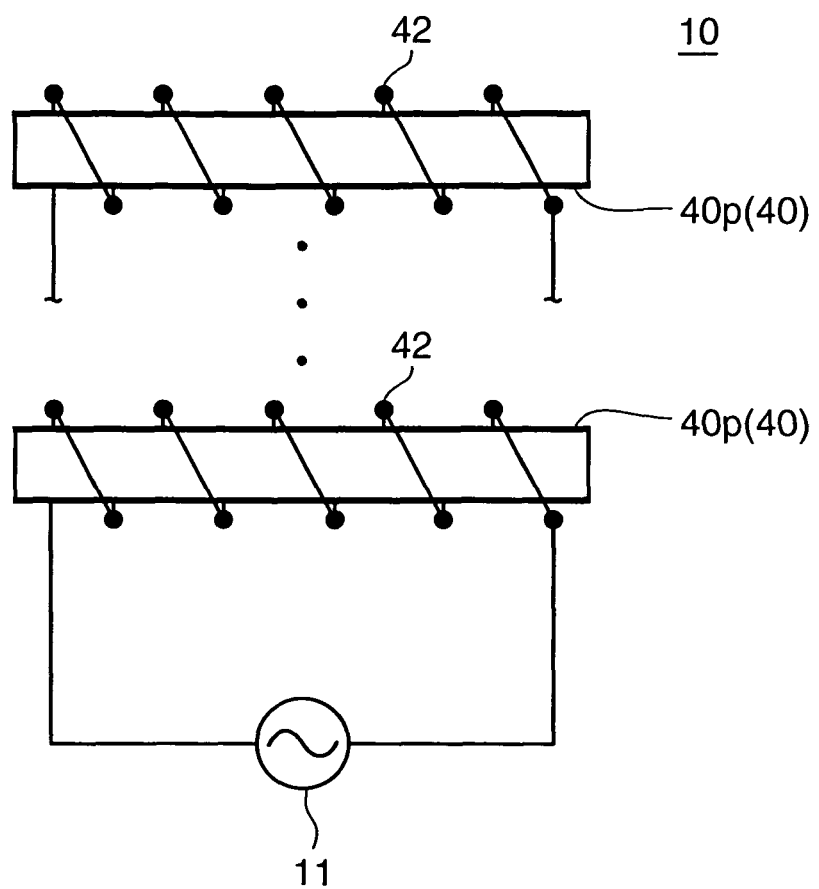
FIG. 14 is a schematic diagram of the heating unit according to the sixth modified example of an embodiment of the present invention.

Moreover, the heating unit 10 may include a plurality of heated bodies 40 and each of the plurality of heated bodies 40 may be configured from a straight tube-shaped piping member 40p as with the sixth modified example of the foregoing embodiment shown in FIG. 14. FIG. 14 shows a schematic diagram of the heating unit 10 according to the sixth modified example.

With the heating unit 10 of the sixth modified example, the straight tube-shaped piping member 40p of the plurality of heated bodies 40 respectively internally include a flow channel through which the nitrogen gas flows, and the nitrogen gas that flows through the medium circulation pathway 4a is diverted in the heating unit 10 and flows through the respective piping members 40p. The respective piping members 40p are configured from a part of the piping member configuring the medium circulation pathway 4a. As with the configuration of the foregoing embodiment, a thermal insulation material not shown, a coil of the induction heating unit 42, and a ferromagnetic nonconductive member not shown are respectively disposed around the respective piping members 40p.

The AC source 11 and the coil of the induction heating unit 42 wound around the respective piping members 40p are electrically connected. The respective piping members 40p are subject to electromagnetic induction heating as a result of power being supplied from the AC source 11 to the coil of the induction heating unit 42 wound around the respective piping members 40, whereby the nitrogen gas flowing in the respective piping members 40p is heated.

As with the sixth modified example, if the heating unit 10 includes a plurality of heated bodies 40 and each of the plurality of heated bodies 40 is configured from the piping member 40p internally provided with a flow channel of nitrogen gas, the total area of the inner surface of all piping members 40p will become the total area that contributes to the heat transfer to the nitrogen gas in the heating unit 10. Thus, the heat-transfer area to the nitrogen gas will increase. It is thereby possible to improve the heat transfer performance to the nitrogen gas; that is, the heating efficiency of the nitrogen gas.

Figure 15:
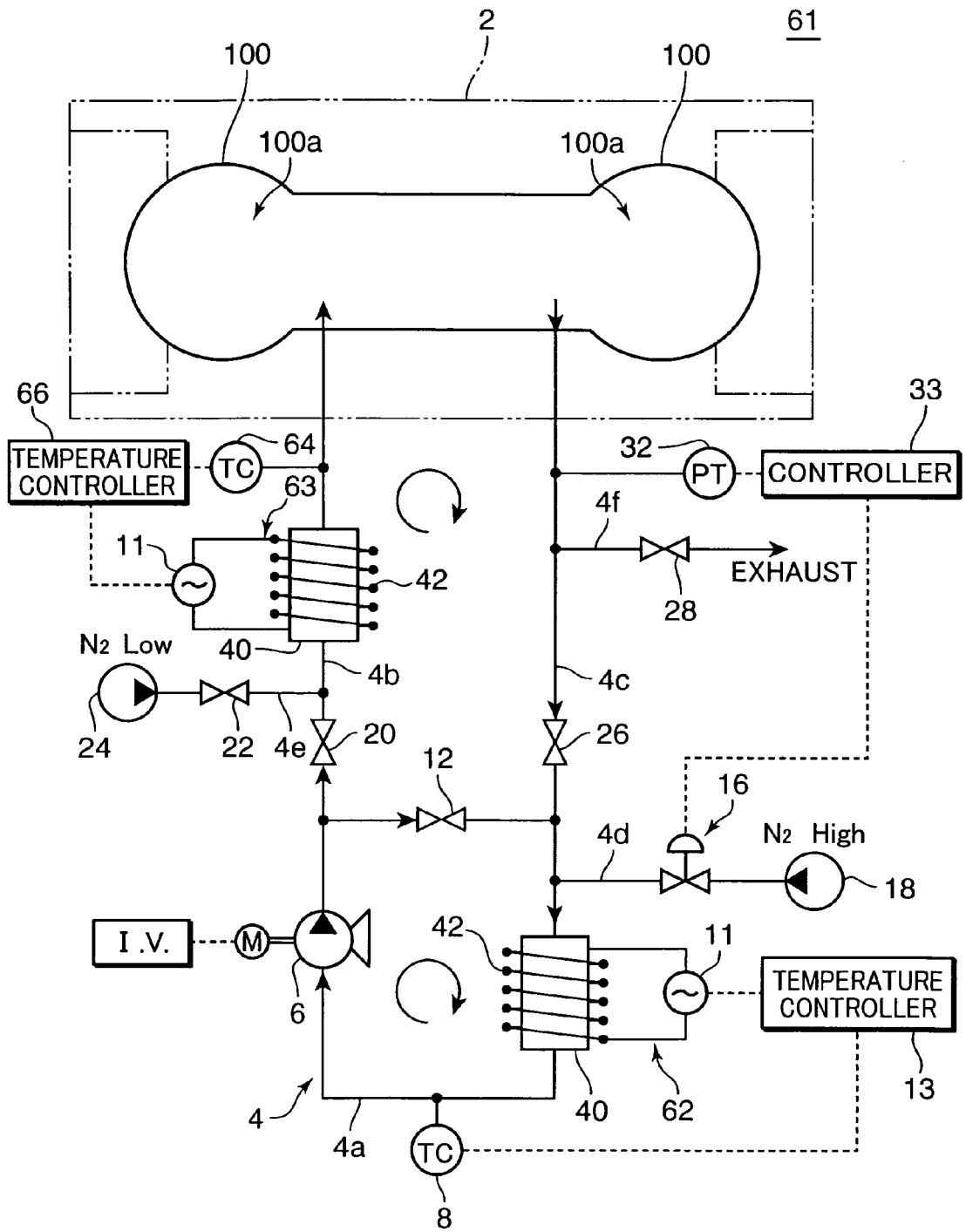
FIG. 15 is a schematic diagram of the tire vulcanizer according to the seventh modified example of an embodiment of the present invention.

Moreover, a tire vulcanizer 61 may comprise two heating units 62, 63 as with the seventh modified example of the foregoing embodiment shown in FIG. 15. FIG. 15 shows a schematic diagram of the tire vulcanizer 61 according to the seventh modified example.

In the seventh modified example, the medium circulation pathway 4a is provided with a first heating unit 62 for performing basic heating, and the medium supply pathway 4b is provided with a second heating unit 63 for performing boost heating. If the temperature in the inner space 100a of the raw tire 100 is low at the initial stage after commencing vulcanization, after the preheating with the first heating unit 62, the nitrogen gas to be supplied to the inner space 100a of the raw tire 100 through the medium supply pathway 4b is subject to boost heating with the second heating unit 63 in order to raise the temperature further. It is thereby possible to accelerate the rise in the temperature of the raw tire 100 and its inner space 100a.

Specifically, the first heating unit 62 has the same structure as the heating unit 10 of the foregoing embodiment. However, the first heating unit 62 is disposed at the upstream side of the medium circulation device 6 in the medium circulation pathway 4a.

The second heating unit 63 has the same structure as the heating unit 10 of the foregoing embodiment. The second heating unit 63 is provided to a part between the position where the low pressure medium supply source path 4e is connected within the medium supply pathway 4b and the mold 2, and the second heating unit 63 is provided with a temperature controller 66 and a gas temperature sensor 64 which are configured the same as the temperature controller 13 and the gas temperature sensor 8 of the foregoing embodiment. The gas temperature sensor 64 detects the temperature of the nitrogen gas flowing to the inner space 100a of the raw tire 100 in the medium supply pathway 4b. The temperature controller 66 controls the thermal capability of the second heating unit 63 based on the detection result of the gas temperature sensor 64. According to this kind of configuration, the low pressure nitrogen gas for shaping to be supplied from the low pressure gas supply source 24 to the inner space 100a of the raw tire 100 through the medium supply pathway 4b can be heated to the intended temperature with the second heating unit 63 based on electromagnetic induction heating.

Moreover, with the seventh modified example, since the first heating unit 62 is provided to the upstream side of the medium circulation device 6 in the medium circulation pathway 4a and to a side that is more downstream than the part where the high pressure medium supply source path 4d is connected to the medium circulation pathway 4a, it is possible to heat the high pressure nitrogen gas, which is supplied in a low temperature state from the high pressure gas supply source 18 to the medium circulation pathway 4a, with the first heating unit 62, and thereafter supply such nitrogen gas to the medium circulation device 6. Thus, it is possible to prevent the decrease in the temperature of the medium circulation device 6.

Figure 16:
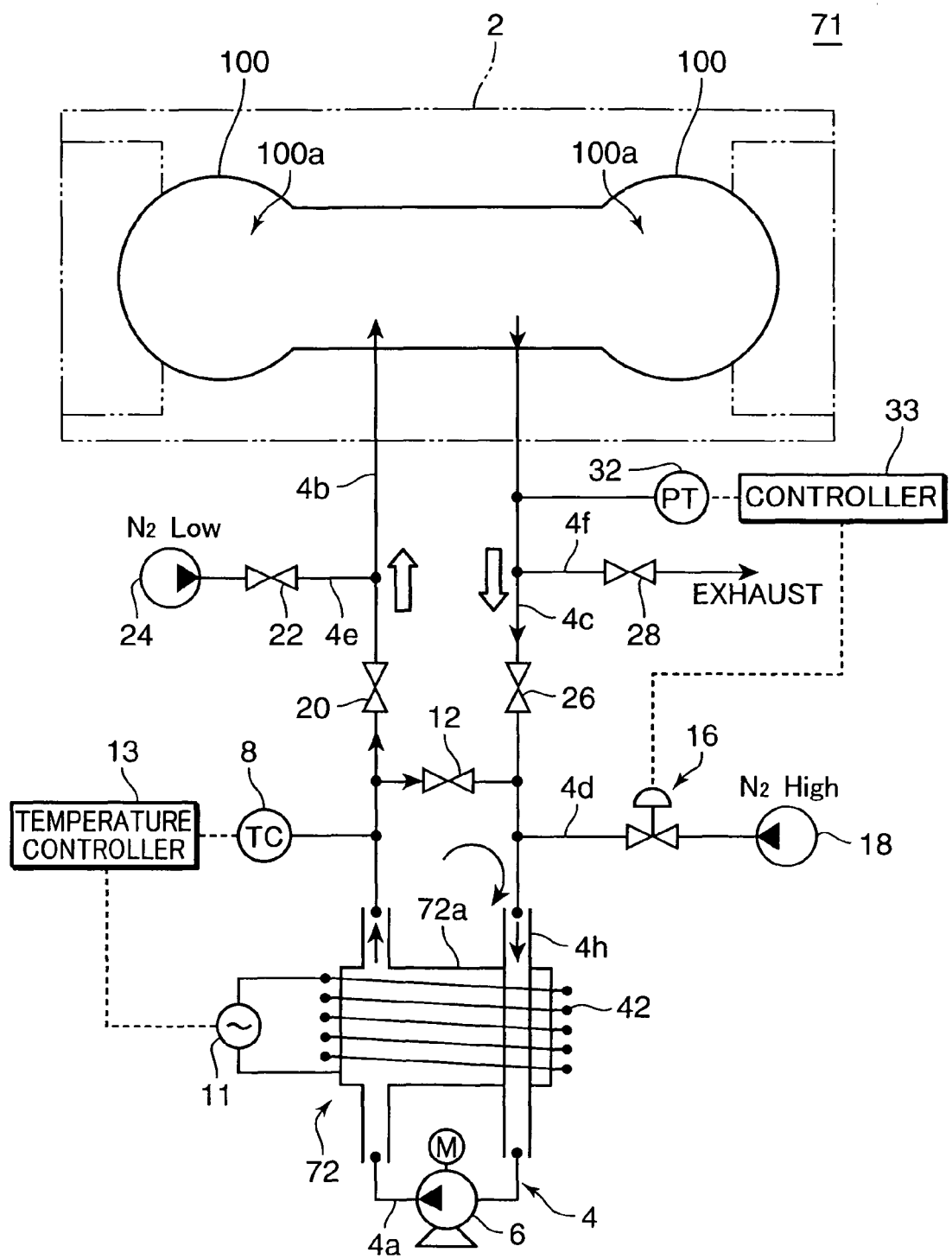
FIG. 16 is a schematic diagram of the tire vulcanizer according to the eighth modified example of an embodiment of the present invention.

Moreover, a part of the piping 4h of the upstream side of the medium circulation device 6 within the medium circulation pathway 4a may penetrate the heated body 72a of the heating unit 72 as with the eighth modified example of the foregoing embodiment shown in FIG. 16. FIG. 16 shows a schematic diagram of the tire vulcanizer 71 according to the eighth modified example.

With the eighth modified example, as with the foregoing embodiment, the heating unit 72 is provided to a position that is on the downstream side of the medium circulation device 6 within the medium circulation pathway 4a and which is on a side that is more upstream than the connection of the medium supply pathway 4b. The configuration of the heating unit 72 is basically the same as the configuration of the heating unit 10 of the foregoing embodiment. However, the heated body 72a of the heating unit 72 is configured with a large diameter piping member.

A part of the piping 4h configuring the portion that is on the upstream side of the medium circulation device 6 within the medium circulation pathway 4a and on a side that is more downstream than the connection of the high pressure medium supply source path 4d penetrates the large diameter piping member of the heated body 72a.

According to this kind of configuration, when the nitrogen gas that is supplied in a low temperature state from the high pressure gas supply source 18 to the medium circulation pathway 4a or the low temperature nitrogen gas that was used for vulcanization and thereafter collected from the inner space 100a of the raw tire 100 to the medium circulation pathway 4a through the medium collection pathway 4c flows inside the piping 4h, the foregoing nitrogen gas can be heated or kept warm pursuant to the electromagnetic induction heating of the heated body 72a in the heating unit 72.

Moreover, in a state where the nitrogen gas is circulating in the medium circulation pathway 4a, the part where the piping 4h is provided will become the part in which the temperature of the nitrogen gas will be relatively low within the medium circulation pathway 4a. However, according to the configuration of the eighth modified example, it is possible to heat or keep warm the nitrogen gas flowing in the piping 4h pursuant to the induction heating of the heated body 72a in the heating unit 72. Accordingly, it is possible to inhibit the decrease in the temperature of the nitrogen gas circulating in the medium circulation pathway 4a within the piping 4h.

Note that in the configuration of the eighth modified example, the second heating unit 63 (refer to FIG. 15) shown in the foregoing seventh modified example may also be provided to the medium supply pathway 4b. Furthermore, a part of the piping configuring the medium collection pathway 4c may penetrate inside the second heating unit 63 as with the second heating unit 83 (refer to FIG. 17) of the ninth modified example described later.

Figure 17:
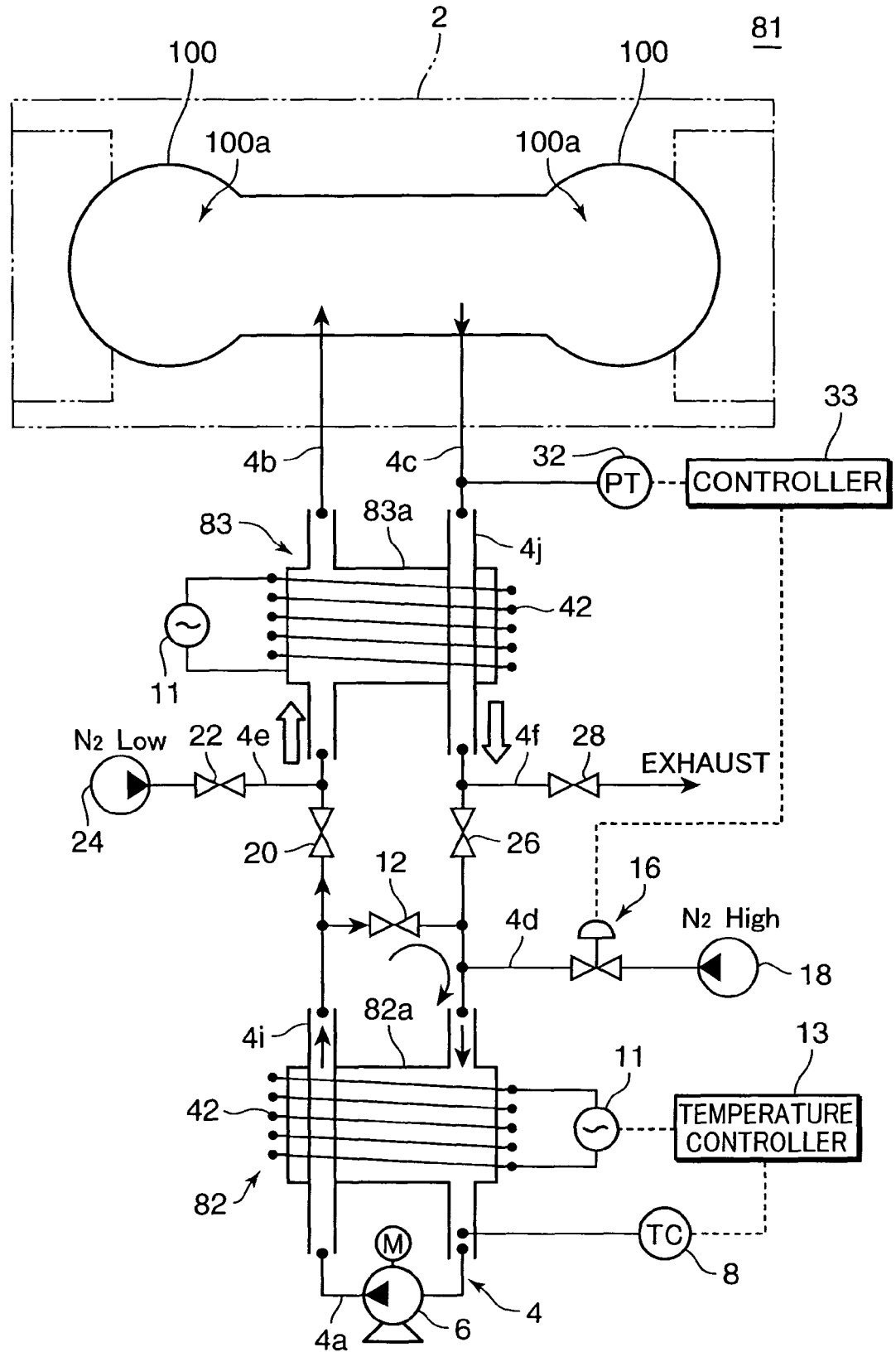
FIG. 17 is a schematic diagram of the tire vulcanizer according to the ninth modified example of an embodiment of the present invention.

Moreover, the tire vulcanizer 81 may comprise two heating units 82, 83, a part of the piping 4i on the downstream side of the medium circulation device 6 within the medium circulation pathway 4a may penetrate the heated body 82a of the first heating unit 82, and a part of the piping 4j configuring the medium collection pathway 4c may penetrate the heated body 83a of the second heating unit 83 as with the ninth modified example of the foregoing embodiment shown in FIG. 17. FIG. 17 shows a schematic diagram of the tire vulcanizer 81 according to the ninth modified example.

With the ninth modified example, the first heating unit 82 is provided to a position that is on the upstream side of the medium circulation device 6 within the medium circulation pathway 4a and at a side that is more downstream than the connection of the high pressure medium supply source path 4d. The structure of the first heating unit 82 is basically the same as the structure of the heating unit 10 according to the foregoing embodiment. However, the heated body 82a of the first heating unit 82 is configured from a large diameter piping member.

A part of the piping 4i configuring the portion on the downstream side of the medium circulation device 6 within the medium circulation pathway 4a and a side that is more upstream side than the connection of the medium supply pathway 4b penetrates the inside of the large diameter piping member of the heated body 82a of the first heating unit 82.

Moreover, the second heating unit 83 is provided to a part between the place where the low pressure medium supply source path 4e is connected within the medium supply pathway 4b and the mold 2. The structure of the second heating unit 83 is also basically the same as the structure of the heating unit 10 according to the foregoing embodiment. However, the heated body 83a of the second heating unit 83 is configured from a large diameter piping member.

A part of the piping 4j configuring the medium collection pathway 4c penetrates the large diameter piping member of the heated body 83a of the second heating unit 83.

According to the configuration of the ninth modified example, the nitrogen gas flowing through the piping 4i of the medium circulation pathway 4a can be heated or kept warm pursuant to the electromagnetic induction heating of the heated body 82a in the first heating unit 82.

Moreover, according to the configuration of the ninth modified example, it is possible to heat or keep warm, in the piping 4j of the medium collection pathway 4c, the low temperature nitrogen gas which is discharged from the inner space 100a of the raw tire 100 after being used for vulcanization and flows to the medium circulation pathway 4a through the medium collection pathway 4c pursuant to the electromagnetic induction heating of the heated body 83a in the second heating unit 83.

Figure 18:
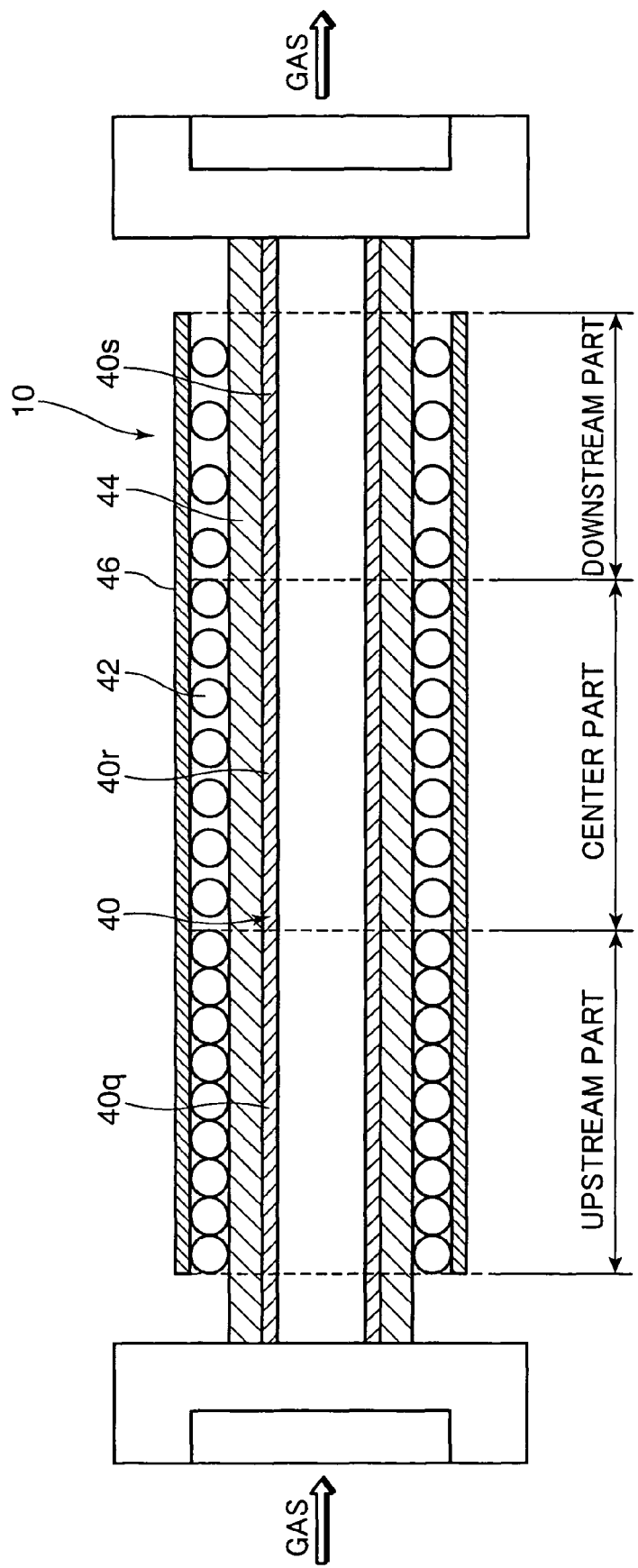
FIG. 18 is a cross section along the axial direction of the heating unit according to the tenth modified example of an embodiment of the present invention.

Moreover, the heated body 40 may be separated in a plurality of sections in the longitudinal direction (three sections in the drawings) and the density of winding the coil of the induction heating unit 42 around the respective sections may be set differently as with the tenth modified example of the foregoing embodiment shown in FIG. 18.

Specifically, the heated body 40 is separated into three sections; namely, an upstream part 40q and a center part 40r and a downstream part 40s in order from the upstream side toward the downstream side in the flow direction of the nitrogen gas, and the density of the coil of the induction heating unit 42 to be wound around these sections are set to become smaller in that order. In other words, the density of the coil of the induction heating unit 42 wound around the center part 40r is set to be smaller than the density of the coil of the induction heating unit 42 wound around the upstream part 40q by setting the winding interval of the coil of the induction heating unit 42 relative to the center part 40r to be greater than the winding interval of the coil of the induction heating unit 42 relative to the upstream part 40q, and the density of the coil of the induction heating unit 42 wound around the downstream part 40s is set to be smaller than the density of the coil of the induction heating unit 42 wound around the center part

40r by setting the winding interval of the coil of the induction heating unit 42 relative to the downstream part 40s to be greater than the winding interval of the coil of the induction heating unit 42 relative to the center part 40r.

Meanwhile, if the coil of the induction heating unit 42 is wound in even intervals across the entire length of the heated body 40, an eddy current will be generated in the center part 40r in a concentrated manner as a result of the overlapping of the magnetic field that is radiated from the coil of the induction heating unit 42 when such coil is energized. Consequently, the surface temperature of the heated body 40 in a state where nitrogen gas is not flowing therein will be the highest at the center part 40r, and the upstream part 40q and the downstream part 40s will be a mutually equal temperature that is lower than the center part 40r. In the foregoing case, if the shortening of the temperature rise time of the nitrogen gas is to be valued or if the output volume of the AC source 11 which supplies power to the induction heating unit 42 becomes high pursuant to a command of the temperature controller 13, the surface temperature of the center part 40r will locally rise, and the mechanical properties of the center part 40r may consequently deteriorate.

Moreover, during the actual tire vulcanization, since cooled nitrogen gas after transferring heat to the raw tire 100, the bladder, the piping and the like is returned to the heated body 40, the temperature difference between the returned nitrogen gas and the upstream part 40q will become the greatest in the heated body 40, and heat will be mainly transferred to the returned nitrogen gas in the upstream part 40q. Consequently, the temperature of the upstream part 40q tends to become the lowest in the heated body 40.

Meanwhile, with the tenth modified example, since the coil of the induction heating unit 42 is wound the most tightly around the upstream part 40q in the heated body 40 and the coil is wound loosely as it heads from the upstream part 40q toward the center part 40r and the downstream part 40s as described above, the temperature of the upstream part 40q can be raised the highest and the level of temperature rise can be reduced as it heads toward the center part 40r and the downstream part 40s. Consequently, it is possible to effectively heat the nitrogen gas in the upstream part 40q in which the temperature difference with the returned nitrogen gas is great and which requires the heat the most. Meanwhile, since the center part 40r and the downstream part 40s that are positioned more on the downstream side than the upstream part 40q do not require the heating of the nitrogen gas as much as the upstream part 40q, the temperature of the center part 40r and the downstream part 40s can be raised without waste. Accordingly, with the tenth modified example, the nitrogen gas can be efficiently heated in the heated body 40.

Moreover, since the density of the coil that is wound around the center part 40r is smaller in comparison to the upstream part 40q, the rise in surface temperature of the center part 40r will be small. Thus, even if the eddy current is concentrated as a result of the overlapping of the magnetic fields, the local rise of the surface temperature is alleviated, and the deterioration of the mechanical properties of the center part 40r can be consequently prevented. Further, even if the coil of the induction heating unit 42 is wound tightly around the upstream part 40q and thereby the temperature of the upstream part 40q is raised the most as described above, since the upstream part 40q will transfer most heat to the nitrogen gas that was cooled and returned, the surface temperature will not rise excessively. Consequently, it is possible to prevent the deterioration in the mechanical properties also in the upstream part 40q.

Note that in order to effectively prevent the deterioration in the mechanical properties of the center part 40r caused by the local rise of the surface temperature in the center part 40r, the density of winding the coil of the induction heating unit 42 may be set gradually smaller in the order of the upstream part 40q, the downstream part 40s, and the center part 40r. Specifically, the winding interval of the coil of the induction heating unit 42 may be set to greater in the order of the upstream part 40q, the downstream part 40s, and the center part 40r. According to this kind of configuration, since the density of the coil of the induction heating unit 42 to be wound around the center part 40r will become the smallest in the heated body 40, it is possible to further reduce the concentration of the eddy current in the center part 40r, effectively prevent the local rise of the surface temperature of the center part 40r, and thereby effectively prevent the deterioration in the mechanical properties thereof. In the foregoing case, the density of the coil wound around the downstream part 40s may be reduced further and made equivalent to the density of the coil wound around the center part 40r.

Moreover, the heated body 40 may also be divided into a plurality of sections in the longitudinal direction other than three sections, and the density of the coil of the induction heating unit 42 to be wound around each section may be changed. For example, the heated body 40 may be divided into four or more sections in the longitudinal direction, and the density of the coil of the induction heating unit 42 to be wound around the respective sections may be set smaller in order from those positioned on the upstream side to those positioned on the downstream side among the respective sections. Further, the heated body 40 may also be divided into two portions; namely, a portion corresponding to the upstream part 40q and a portion corresponding to an area combining the center part 40r and the downstream part 40s, and the density of the coil of the induction heating unit 42 wound around the portion positioned at the upstream side among the two portions may be set greater than the density of the coil of the induction heating unit 42 wound around the portion positioned on the downstream side.

Moreover, the winding interval of the coil of the induction heating unit 42 relative to the heated body 40 can be increased in a geometric progression from the upstream side toward the downstream side in the flow direction of the nitrogen gas.

Figure 19:
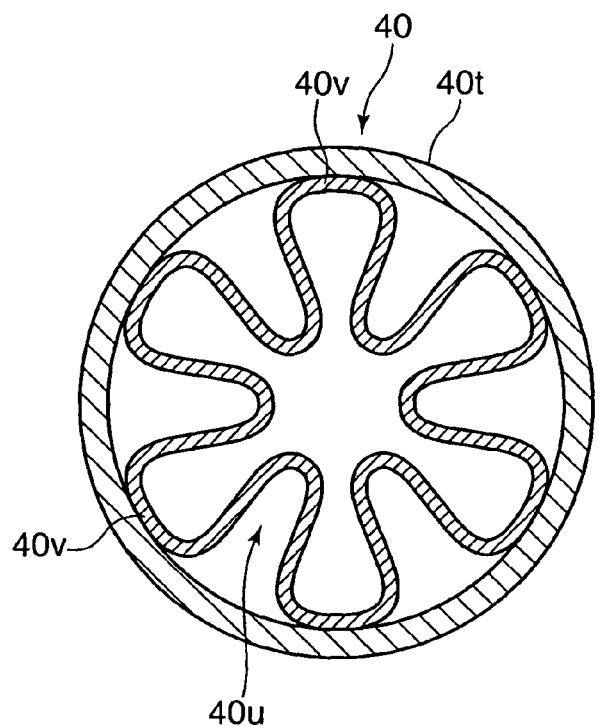
FIG. 19 is a cross section that is perpendicular to the axial direction of the heated body according to the eleventh modified example of an embodiment of the present invention.

In addition, as with the eleventh modified example of the foregoing embodiment shown in FIG. 19, a structure may be adopted where the heated body 40 is configured from an external cylinder 40t and an inner heat-transfer tube 40u, heat is transferred to the inner heat-transfer tube 40u from the external cylinder 40t that was subject to induction heating, and such heat can be transferred from the inner heat-transfer tube 40u to the nitrogen gas.

Specifically, the external cylinder 40t is a cylindrical straight tube that is configured from a ferromagnetic conductive material such as carbon steel or SUS420. The inner heat-transfer tube 40u is configured from a highly thermal conductive material such as copper alloy or aluminum, and is a tube-shaped member including a plurality of leaf-like parts 40v (six in the eleventh modified example) in which the width in the circumferential direction gradually becomes greater toward a radially outward direction. A plurality of leaf-like parts 40v are formed, with spacing therebetween, in the circumferential direction of the inner heat-transfer tube 40u. The external cylinder 40t and the inner heat-transfer tube 40u are formed integrally by being simultaneously subject to a drawing process. Among the respective leaf-like parts 40v, the outer surface positioned radially outward of the inner heat-transfer tube 40u is pressure-contacted to the inner surface of the external cylinder 40t, and heat is transferred from the external cylinder 40t to the inner heat-transfer tube 40u through the pressure-contacted portion. The nitrogen gas flows through both the space inside the inner heat-transfer tube 40*u* and the space that is encompassed with the outer surface of the inner heat-transfer tube 40*u* and the inner surface of the external cylinder 40*t*. Heat is transferred to the nitrogen gas flowing through the space inside the inner heat-transfer tube 40*u* from the inner surface of the inner heat-transfer tube 40*u*. Meanwhile, heat is transferred to the nitrogen gas flowing through the space encompassed with the outer surface of the inner heat-transfer tube 40*u* and the inner surface of the external cylinder 40*t* from both the outer surface of the inner heat-transfer tube 40*u* and the inner surface of the external cylinder 40*t*. Since the inner heat-transfer tube 40*u* is configured from a highly thermal conductive material, the heat exchange between the inner heat-transfer tube 40*u* and the nitrogen gas can be performed easily.

As with the eleventh modified example, by providing the inner heat-transfer tube 40*u* including a plurality of leaf-like parts 40*v* to the inside of the external cylinder 40*t*, it is possible to increase the heat-transfer area to the nitrogen gas flowing inside the heated body 40 without having to increase the cross-sectional area of the flow channel in the heated body 40. Specifically, since the inner surface of the external cylinder 40*t* and the inner surface and outer surface of the inner heat-transfer tube 40*u* are used for transferring heat to the nitrogen gas, the heat-transfer area can be dramatically increased in comparison to a structure of transferring heat to the nitrogen gas only from the inner surface of the piping. It is thereby possible to dramatically improve the heat exchange efficiency.

Figure 20:
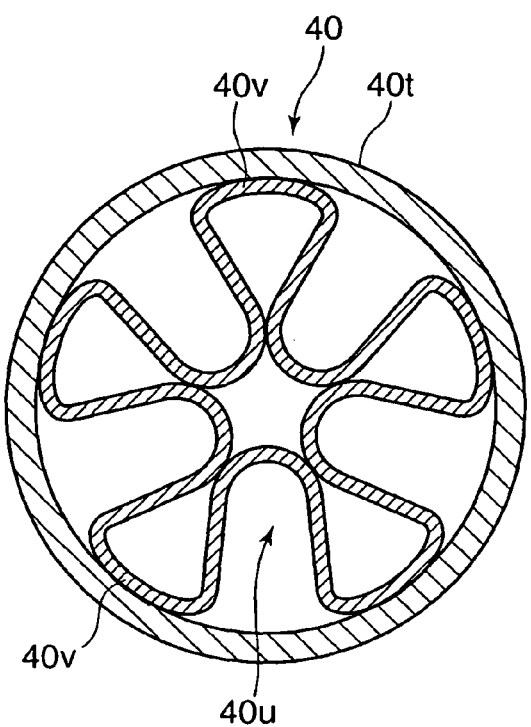
FIG. 20 is a cross section that is perpendicular to the axial direction of the heated body according to the twelfth modified example of an embodiment of the present invention.

Note that the inner heat-transfer tube 40*u* may be configured to include five leaf-like parts 40*v* as with the twelfth modified example shown in FIG. 20 other than the configuration of including six leaf-like parts 40*v* shown in FIG. 19, and may also be configured to including a number of leaf-like parts 40*v* other than six or five.

Figure 21:
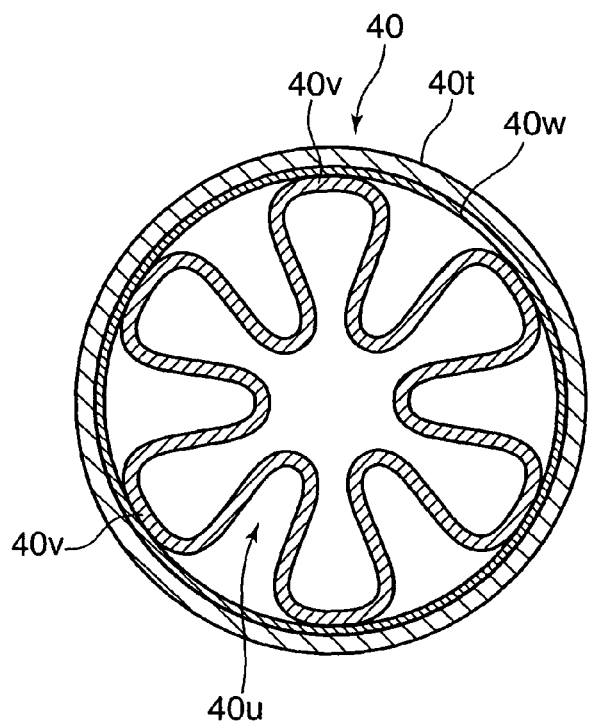
FIG. 21 is a cross section that is perpendicular to the axial direction of the heated body according to the thirteenth modified example of an embodiment of the present invention.

Moreover, as with the thirteenth modified example of the foregoing embodiment shown in FIG. 21, the heated body 40 may be configured from triple tubes; namely, the external cylinder 40*t* and the internal cylinder 40*w* and the inner heat-transfer tube 40*u*. In the foregoing case, the internal cylinder 40*w* is a cylindrical straight tube configured from a highly thermal conductive material such as copper alloy or aluminum. The internal cylinder 40*w* is provided inside the external cylinder 40*t*, and the outer surface of the internal cylinder 40*w* is pressure-contacted to the inner surface of the external cylinder 40*t*. Further, as with the foregoing eleventh modified example, the inner heat-transfer tube 40*u* including a plurality of leaf-like parts 40*v* (six in FIG. 21) is provided inside the internal cylinder 40*w*. Among the respective leaf-like parts 40*v*, the outer surface positioned radially outward of the inner heat-transfer tube 40*u* is pressure-contacted to the inner surface of the internal cylinder 40*w*. The nitrogen gas flows through both the space inside the inner heat-transfer tube 40*u* and the space encompassed with the outer surface of the inner heat-transfer tube 40*u* and the inner surface of the internal cylinder 40*w*. The heat that is radiated from the external cylinder 40*t* through induction heating is transferred to the internal cylinder 40*w*, and transferred from the inner surface of the internal cylinder 40*w* to the nitrogen gas flowing through the space encompassed with the inner surface of the internal cylinder 40*q* and the outer surface of the inner heat-transfer tube 40*u*. In addition, such heat is transferred from the internal cylinder 40*w* to the inner heat-transfer tube 40*u* and transferred to the nitrogen gas flowing through the corresponding space from the inner surface and outer surface of the inner heat-transfer tube 40*u*.

With the thirteenth modified example, as with the foregoing eleventh modified example, it is possible to increase the heat-transfer area to the nitrogen gas flowing in the heated body 40 with the inner heat-transfer tube 40*u*. Moreover, with the thirteenth modified example, the heat exchange efficiency can be further increased since it is possible to transfer heat from the inner surface of the internal cylinder 40*w* configured from a highly thermal conductive material to the nitrogen gas flowing through the space positioned on the outside of the inner heat-transfer tube 40*u* in the internal cylinder 40*w*.

Figure 22:
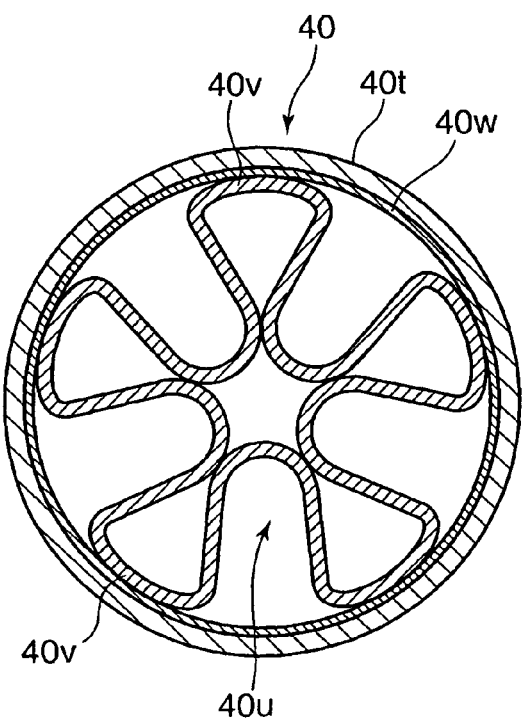
FIG. 22 is a cross section that is perpendicular to the axial direction of the heated body according to the fourteenth modified example of an embodiment of the present invention.

When configuring the foregoing heated body 40 with triple tubes, as with the fourteenth modified example shown in FIG. 22, the inner heat-transfer tube 40*u* may include five leaf-like parts 40*v*, or the inner heat-transfer tube 40*u* may include a number of leaf-like parts 40*v* other than six or five.

Moreover, in the foregoing eleventh modified example to fourteenth modified example, the inner heat-transfer tube 40*u* may be twisted and formed in a spiral shape. According to the foregoing configuration, the heat-transfer area to the nitrogen gas flowing in the heated body 40 can be increased without having to changing the length of the heated body 40.

In the foregoing embodiments and modified examples described above, although a case was explained where nitrogen gas was used as the heating and pressurizing medium for vulcanizing the raw tire 100, various other mediums other than nitrogen gas may be used as the heating and pressurizing medium. For example, vapor, inert gas other than nitrogen gas, air or the like may be used as the heating and pressurizing medium.

Moreover, in the foregoing embodiments, although a case was explained where the nitrogen gas after being used for vulcanization was collected with the medium circulation pathway 4*a* through the medium collection pathway 4*c*, a part or all of the heating and pressurizing medium after vulcanization may be discharged through the exhaust path 4*f* by opening the exhaust valve 28.

Moreover, other than disposing a plurality of ferromagnetic nonconductive members 46 around the induction heating unit 42 as with the foregoing embodiment, the shield effect against the line of magnetic force radiated from the induction heating unit 42 can also be yielded by providing a tubular ferromagnetic nonconductive member around the induction heating unit 42.

SUMMARY OF FOREGOING EMBODIMENTS AND MODIFIED EXAMPLES

The foregoing embodiments and modified examples can be summarized as follows.

Specifically, the tire vulcanizer according to the foregoing embodiments and modified examples is a tire vulcanizer for vulcanizing a raw tire, comprising: a mold for removably housing the raw tire; a medium path which is connected to the inner space of the raw tire housed in the mold and through which the heating and pressurizing medium for vulcanizing the raw tire flows; and a heating unit, provided to the medium path, for controlling a temperature of the heating and pressurizing medium flowing through the medium path, wherein the heating unit includes a heated body internally provided with a flow channel through which the heating and pressurizing medium flows, and an induction heating unit for heating the heated body through electromagnetic induction so as to heat the heating and pressurizing medium flowing through the flow channel.

With this tire vulcanizer, the heated body can be heated through electromagnetic induction in the heating unit, and the heating and pressurizing medium flowing through the flow channel in the heated body can be heated pursuant to the heating of the heated body. Specifically, with this tire vulcanizer, since the heating and pressurizing medium inside the heated body can be heated by causing the heated body to generate heat directly, unlike the case of heating the heating and pressurizing medium using the sheath heater inserted into the piping, there will be no delay in the rising of the temperature caused by the thermal capacity of the sheath heater. Thus, the rising of the temperature of the heating and pressurizing medium can be accelerated.

In addition, with this tire vulcanizer, since the heating and pressurizing medium is heated by causing the heated body to generate heat directly through electromagnetic induction, unlike the case of using the sheath heater inserted into the piping, it is not necessary to expand the diameter of the piping for inserting the sheath heater therein, and there will be no increase in the heat radiation area caused by a part of the sheath heater being positioned outside of the piping. Thus, with this tire vulcanizer, it is possible to reduce the heat radiation area in comparison to the case of using the sheath heater, and consequently reduce heat loss. Moreover, with this tire vulcanizer, since the heating and pressurizing medium can be heated with its internal medium path, unlike a tire vulcanizer that vulcanizes a raw tire by supplying externally-generated steam to the medium path and introducing such steam to the inner space of the raw tire from the medium path, it is possible to prevent the heat loss associated with the transport of the heating and pressurizing medium from the outside, and consequently reduce heat loss. Accordingly, with this tire vulcanizer, it is possible to accelerate the rise in the temperature of the heating and pressurizing medium and reduce heat loss.

With the foregoing tire vulcanizer, preferably, the heating unit includes a thermal insulation material disposed between the heated body and the induction heating unit.

According to the foregoing configuration, since it is possible to prevent the heat of the heated body from being transferred to the induction heating unit with the thermal insulation material upon heating the heated body through electromagnetic induction, it is possible to inhibit the thermal degradation of the induction heating unit. Moreover, even if the thermal insulation material is disposed between the heated body and the induction heating unit as described above, since the heated body is heated through electromagnetic induction with this configuration, the thermal insulation material will not obstruct the heating of the heated body and thereby the heated body can be heated effectively.

With the foregoing tire vulcanizer, preferably, the medium path includes a piping member through which the heating and pressurizing medium flows, and the heated body is configured from a part of the piping member of the medium path.

According to the foregoing configuration, since the heated body will concurrently function as a part of the piping member of the medium path, it is possible to reduce the number of members and inhibit the manufacturing cost of the heated body in comparison to a case of separately providing the piping member of the medium path and the heated body.

In the foregoing case, preferably, the induction heating unit is configured from a magnetic force generating member which is disposed around the piping member configuring the heated body and which exerts a line of magnetic force to the piping member, and the heating unit includes a ferromagnetic nonconductive member disposed on the outside of the magnetic force generating member in a radial direction of the piping member configuring the heated body.

According to the foregoing configuration, the ferromagnetic nonconductive member on the outside of the magnetic force generating member will function as a shield, and thereby it is possible to prevent the line of magnetic force radiated from the magnetic force generating member from being transferred to the outside and concentrate such line of magnetic force on the inside. Consequently, it is possible to prevent the line of magnetic force radiated from the magnetic force generating member from being transferred to the outside and unintentionally heating the other piping or metal members, prevent adverse effects to the outside world caused by the line of magnetic force from the magnetic force generating member, and favorably perform heating through electromagnetic induction by concentrating the line of magnetic force radiated from the magnetic force generating member on the internal heated body.

Moreover, in the foregoing case, preferably, the magnetic force generating member is configured from a coil which is wound around the piping member configuring the heated body and which radiates a line of magnetic force through energization.

According to the foregoing configuration, it is possible to uniformly exert the line of magnetic force from the periphery of the piping member configuring the heated body and thereby uniformly generate electromagnetic induction in the circumferential direction of the heated body, and consequently inhibit the generation of uneven heating in the circumferential direction of the heated body.

With the foregoing tire vulcanizer, preferably, at least a part of the heated body is configured from a ferromagnetic conductive material.

Since a ferromagnetic conductive material is a material that is favorably subject electromagnetic induction, the heated body can be heated favorably through electromagnetic induction by causing at least a part of the heated body to be configured from a ferromagnetic conductive material as with the foregoing configuration.

In the foregoing case, the heated body may include a portion configured from a ferromagnetic conductive material and a portion configured from a highly thermal conductive material.

According to the foregoing configuration, it is possible to favorably heat the portion configured from a ferromagnetic conductive material through electromagnetic induction, and efficiently transfer the heat generated with the foregoing heating to the heating and pressurizing medium with the portion configured from a highly thermal conductive material.

With the foregoing tire vulcanizer, preferably, the heated body includes an inner surface which encompasses the flow channel and to which concave-convex parts are formed.

According to the foregoing configuration, since it is possible to increase the surface area of the inner surface of the heated body to come in contact with the heating and pressurizing medium, the heating efficiency of the heating and pressurizing medium can be improved.

In the foregoing case, the heated body may be formed in a straight tube shape, and the concave-convex parts may extend linearly in the axial direction of the heated body.

A structure in which the concave-convex parts extending linearly in the axial direction are provided to the inner surface of the straight tube-shaped heated body as described above can be formed with a single extrusion process, and thereby the manufacturing processing of the heated body including the concave-convex parts on the inner surface can be simplified.

In the foregoing configuration where the concave-convex parts are formed on the inner surface of the heated body, preferably, the heated body is configured from a plurality of straight tube-shaped heated body segments which are connected in the axial direction thereof, each of the heated body segments includes a concave part and a convex part alternately disposed in the circumferential direction on the inner surface and extending in the axial direction thereof, and the concave parts and the convex parts of the heated body segments which are adjacent in the axial direction are disposed so that phases thereof in the circumferential direction are mutually displaced.

With the foregoing configuration, as a result of the concave part and the convex part of the heated body segments which are adjacent in the axial direction being disposed so that the phases in the circumferential direction are mutually displaced, the velocity boundary layer of the heating and pressurizing medium flowing through the flow channel in the heated body will be updated, and thereby heat can be sufficiently transferred from the heated body to the heating and pressurizing medium. Consequently, it is possible to improve the heating efficiency of the heating and pressurizing medium.

With the foregoing tire vulcanizer, the heated body may be internally provided with a perforated plate disposed in such a direction that the perforated plate blocks the flow channel.

According to the foregoing configuration, the flow of the heating and pressurizing medium flowing through the flow channel in the heated body will be disturbed by the perforated plate and thereby the velocity boundary layer to be formed in the vicinity of the inner surface of the heated body will become thin, and heat can be sufficiently transferred from the heated body to the heating and pressurizing medium and the surface area inside the heated body to come in contact with the heating and pressurizing medium will increase. Consequently, it is possible to improve the heating efficiency of the heating and pressurizing medium.

With the foregoing tire vulcanizer, preferably, the heating unit includes a plurality of the heated bodies, and each of the plurality of heated bodies is configured from a piping member internally provided with a flow channel through which the heating and pressurizing medium flows.

According to the foregoing configuration, since the total area of the inner surface of the piping member of all heated bodies will become the total area to contribute to the heat transfer to the heating and pressurizing medium, the heat-transfer area to the heating and pressurizing medium will increase. Consequently, it is possible to improve the heating efficiency of the heating and pressurizing medium.

The invention claimed is:

1. A tire vulcanizer for vulcanizing a raw tire, comprising:
   a mold for removably housing the raw tire;
   a medium path which is connected to the inner space of the raw tire housed in the mold and through which a heating and pressurizing medium for vulcanizing the raw tire flows; and
   a heating unit, provided to the medium path, for controlling a temperature of the heating and pressurizing medium flowing through the medium path,
      wherein the heating unit includes a heated body internally provided with a flow channel through which the heating and pressurizing medium flows, and an induction heating unit for heating the heated body through electromagnetic induction so as to heat the heating and pressurizing medium flowing through the flow channel, and
      wherein the medium path includes a piping member through which the heating and pressurizing medium flows, the heated body is configured from a part of the piping member of the medium path, the induction heating unit is configured from a magnetic force generating member which is disposed around the piping member configuring the heated body and which exerts a line of magnetic force to the piping member, and the heating unit includes a ferromagnetic nonconductive member disposed on the outside of the magnetic force generating member in a radial direction of the piping member configuring the heated body.

2. The tire vulcanizer according to claim 1, wherein the heating unit includes a thermal insulation material disposed between the heated body and the induction heating unit.

3. The tire vulcanizer according to claim 1, wherein the magnetic force generating member is configured from a coil which is wound around the piping member configuring the heated body and which radiates a line of magnetic force through energization.

4. The tire vulcanizer according to claim 1, wherein at least a part of the heated body is configured from a ferromagnetic conductive material.

5. The tire vulcanizer according to claim 4, wherein the heated body includes a portion configured from the ferromagnetic conductive material and a portion configured from a thermal conductive material.

6. The tire vulcanizer according to claim 1, wherein the heated body includes an inner surface which encompasses the flow channel and to which concave-convex parts are formed.

7. The tire vulcanizer according to claim 6, wherein
   the heated body is formed in a straight tube shape, and
   the concave-convex parts extend linearly in the axial direction of the heated body.

8. The tire vulcanizer according to claim 6, wherein
   the heated body is configured from a plurality of straight tube-shaped heated body segments which are connected in the axial direction thereof,
   each of the heated body segments includes a concave part and a convex part alternately disposed in the circumferential direction on the inner surface and extending in the axial direction thereof, and
   the concave parts and the convex parts of the heated body segments which are adjacent in the axial direction are disposed so that phases thereof in the circumferential direction are mutually displaced.

9. The tire vulcanizer according to claim 1, wherein the heated body is internally provided with a perforated plate disposed in such a direction that the perforated plate blocks the flow channel.

10. The tire vulcanizer according to claim 1, wherein
   the heating unit includes a plurality of the heated bodies, and
   each of the plurality of heated bodies is configured from a piping member internally provided with a flow channel through which the heating and pressurizing medium flows.

* * * * *

UNITED STATES PATENT AND TRADEMARK OFFICE
CERTIFICATE OF CORRECTION

| | | |
|---|---|---|
| PATENT NO. | : 8,414,278 B2 | Page 1 of 1 |
| APPLICATION NO. | : 12/736231 | |
| DATED | : April 9, 2013 | |
| INVENTOR(S) | : Okada et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 297 days.

Signed and Sealed this
Twenty-fifth Day of June, 2013

Teresa Stanek Rea
*Acting Director of the United States Patent and Trademark Office*